(12) United States Patent
Takahashi et al.

(10) Patent No.: US 12,165,075 B2
(45) Date of Patent: Dec. 10, 2024

(54) SERVER THAT CREATES AN ANOMALY DETECTION MODEL, RECORDING MEDIUM FOR CREATING THE ANOMALY DETECTION MODEL, AND METHOD FOR CREATING THE ANOMALY DETECTION MODEL

(71) Applicant: Panasonic Intellectual Property Corporation of America, Torrance, CA (US)

(72) Inventors: Ryota Takahashi, Osaka (JP); Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1104 days.

(21) Appl. No.: 16/921,199

(22) Filed: Jul. 6, 2020

(65) Prior Publication Data
US 2020/0334554 A1 Oct. 22, 2020

Related U.S. Application Data

(63) Continuation of application No. PCT/JP2018/041277, filed on Nov. 7, 2018.
(Continued)

(30) Foreign Application Priority Data

Jun. 8, 2018 (JP) .................................. 2018-110275

(51) Int. Cl.
G06N 5/04 (2023.01)
G06N 20/00 (2019.01)
(Continued)

(52) U.S. Cl.
CPC ............... *G06N 5/04* (2013.01); *G06N 20/00* (2019.01); *H04L 43/08* (2013.01); *H04L 67/12* (2013.01)

(58) Field of Classification Search
CPC ............ G06F 11/0709; G06F 11/0739; G06F 11/0775; G06F 11/3006; G06F 11/3013;
(Continued)

(56) References Cited

U.S. PATENT DOCUMENTS

2009/0040054 A1* 2/2009 Wang ................... G06V 20/597
340/576
2015/0170522 A1* 6/2015 Noh ................. G08G 1/096741
701/117
(Continued)

FOREIGN PATENT DOCUMENTS

JP 2009-3822 1/2009
JP 2017-33186 2/2017
(Continued)

OTHER PUBLICATIONS

Han, Xu, et al. "A model for website anomaly detection based on log analysis." 2014 IEEE 3rd International Conference on Cloud Computing and Intelligence Systems. IEEE, 2014: 605-608 (Year: 2014).*
(Continued)

*Primary Examiner* — Randall K. Baldwin
(74) *Attorney, Agent, or Firm* — Wenderoth, Lind & Ponack, L.L.P.

(57) ABSTRACT

A server includes memory and a processor that obtains a log created by a first node monitored on a V2X network, selects predetermined information therefrom, and performs supervised machine learning using the selected predetermined information as training data to create a model for a monitoring node that monitors the first node. The log associatively includes a time, and at the time: first node status
(Continued)

information as indicated by at least one of sensor or control data on the first node; first anomaly information indicating whether an anomaly occurred on the first node; and second anomaly information indicating whether an anomaly occurred on a second, surrounding node of the first node that communicates with the first node. When the first anomaly information indicates an anomaly, or when the first and second anomaly information indicate no anomaly and an anomaly, respectively, the associated status information is selected as the predetermined information.

9 Claims, 18 Drawing Sheets

Related U.S. Application Data

(60) Provisional application No. 62/620,154, filed on Jan. 22, 2018.

(51) Int. Cl.
  *H04L 43/08* (2022.01)
  *H04L 67/12* (2022.01)

(58) Field of Classification Search
  CPC ............. G06F 11/3055; G06F 11/3058; G06F 11/3065; G06F 11/3089; G06F 11/3476; G06F 21/55; G06F 21/552; G06F 21/566; G06N 20/00; G06N 5/04; H04L 41/069; H04L 41/142; H04L 41/16; H04L 41/08; H04L 43/0817; H04L 63/1425; H04L 67/12; H04L 63/1416; H04L 43/08; H04W 4/44; H04W 4/46; H04W 4/48
  See application file for complete search history.

(56) References Cited

U.S. PATENT DOCUMENTS

| | | | |
|---|---|---|---|
| 2015/0271201 A1* | 9/2015 | Ruvio | B60R 16/0231 726/23 |
| 2016/0381068 A1* | 12/2016 | Galula | G07C 5/0816 726/23 |
| 2017/0032671 A1* | 2/2017 | Toyama | G06F 21/64 |
| 2017/0318034 A1* | 11/2017 | Holland | G06N 20/10 |
| 2017/0345231 A1* | 11/2017 | Kumabe | H04W 4/30 |
| 2017/0366935 A1* | 12/2017 | Ahmadzadeh | H04M 1/72457 |
| 2018/0255082 A1* | 9/2018 | Ostergaard | G06N 20/00 |
| 2018/0295147 A1 | 10/2018 | Haga et al. | |
| 2018/0300964 A1* | 10/2018 | Lakshamanan | G06F 9/5027 |
| 2019/0012908 A1* | 1/2019 | Chun | G08G 1/04 |
| 2019/0041223 A1* | 2/2019 | Yang | G01C 21/30 |

FOREIGN PATENT DOCUMENTS

| | | |
|---|---|---|
| JP | 2017-111796 | 6/2017 |
| WO | 2016/116991 | 7/2016 |

OTHER PUBLICATIONS

Alheeti, Khattab M. Ali, Anna Gruebler, and Klaus D. McDonald-Maier. "An intrusion detection system against malicious attacks on the communication network of driverless cars." 2015 12th Annual IEEE Consumer Communications and Networking Conference (CCNC). IEEE, 2015: 916-921 (Year: 2015).*
Berlin, Olga, et al. "POSTER: Anomaly-based misbehaviour detection in connected car backends." 2016 IEEE Vehicular Networking Conference (VNC). IEEE, 2016. (Year: 2016).*
Bhargava, Bharat K., et al. "A Systematic Approach for Attack Analysis and Mitigation in V2V Networks." J. Wirel. Mob. Networks Ubiquitous Comput. Dependable Appl. 7.1 (2016): 79-96. (Year: 2016).*
Hamad, Mohammad, Marcus Nolte, and Vassilis Prevelakis. "Towards comprehensive threat modeling for vehicles." the 1st Workshop on Security and Dependability of Critical Embedded Real-Time Systems. 2016. (Year: 2016).*
Kang, Min-Joo, and Je-Won Kang. "Intrusion detection system using deep neural network for in-vehicle network security." PloS one 11.6 (2016): e0155781: 1-17 (Year: 2016).*
Kumar, Nandan, Pankaj Kumar Keserwani, and Shefalika Ghosh Samaddar. "A comparative study of machine learning methods for generation of digital forensic validated data." 2017 ninth international conference on advanced computing (ICoAC). IEEE, 2017: 15-20 (Year: 2017).*
Akar, Arif. Machine learning based anomaly detection technique for in-vehicle networks. MS thesis. Çankaya Üniversitesi, 2017: i-86. (Year: 2017).*
Wang, Chundong, et al. "A Distributed Anomaly Detection System for In-Vehicle Network using HTM." Jan. 2018: 1-8 (Year: 2018).*
Chong, Freddy, et al. "Detecting flow anomalies in distributed systems." 2014 IEEE International Conference on Data Mining. IEEE, 2014: 100-109 (Year: 2014).*
Levi, Matan, Yair Allouche, and Aryeh Kontorovich. "Advanced Analytics for Connected Cars Cyber Security." arXiv preprint arXiv:1711.01939 v2 (2017). (Year: 2017).*
Extended European Search Report issued Mar. 12, 2021 in corresponding European Patent Application No. 18901690.0.
International Search Report (ISR) issued on Jan. 15, 2019 in International (PCT) Application No. PCT/JP2018/041277.
International Preliminary Report on Patentability (IPRP) issued on Dec. 10, 2019 in International (PCT) Application No. PCT/JP2018/041277.

\* cited by examiner

FIG. 4

| TIME | POSITION INFORMATION | IN-VEHICLE STATUS INFORMATION |
|---|---|---|
| 2018/10/02 9:10:30 | N35, E135 | 80 km/h; 0.3 G;... |
| 2018/10/02 9:11:32 | N35, E135 | 81 km/h; 0.1 G;... |
| 2018/10/02 9:12:31 | N35, E135 | 79 km/h; 0.2 G;... |
| 2018/10/02 9:13:32 | N35, E135 | 79 km/h; 0.2 G;... |
| 2018/10/02 9:14:30 | N35, E135 | 81 km/h; 0.2 G;... |
| ⋮ | ⋮ | ⋮ |

FIG. 5

| TIME | POSITION INFORMATION | IN-VEHICLE STATUS INFORMATION | IN-VEHICLE ANOMALY DETERMINATION | IN-VEHICLE ANOMALY TYPE |
|---|---|---|---|---|
| 2018/10/02 9:10:30 | N35, E135 | 80 km/h; 0.3 G;... | NORMAL | — |
| 2018/10/02 9:11:32 | N35, E135 | 81 km/h; 0.1 G;... | ANOMALY | CAN |
| 2018/10/02 9:12:31 | N35, E135 | 79 km/h; 0.2 G;... | NORMAL | — |
| 2018/10/02 9:13:32 | N35, E135 | 79 km/h; 0.2 G;... | ANOMALY | CAN |
| 2018/10/02 9:14:30 | N35, E135 | 81 km/h; 0.2 G;... | ANOMALY | IVI, ETHERNET |
| ⋮ | ⋮ | ⋮ | ⋮ | ⋮ |

FIG. 6

| TIME | POSITION INFORMATION | IN-VEHICLE STATUS INFORMATION | IN-VEHICLE ANOMALY DETERMINATION | IN-VEHICLE ANOMALY TYPE | SURROUNDING NODE ANOMALY DETERMINATION | SURROUNDING NODE ANOMALY TYPE |
|---|---|---|---|---|---|---|
| 2018/10/02 9:10:30 | N35, E135 | 80 km/h; 0.3 G;... | NORMAL | — | NORMAL | — |
| 2018/10/02 9:11:32 | N35, E135 | 81 km/h; 0.1 G;... | ANOMALY | CAN | ANOMALY | INFRASTRUCTURE (TRAFFIC SIGNAL) |
| 2018/10/02 9:12:31 | N35, E135 | 79 km/h; 0.2 G;... | NORMAL | — | ANOMALY | VEHICLE ID : XXX (CAN) |
| 2018/10/02 9:13:32 | N35, E135 | 79 km/h; 0.2 G;... | ANOMALY | CAN | ANOMALY | INFRASTRUCTURE (ETC GATE) |
| 2018/10/02 9:14:30 | N35, E135 | 81 km/h; 0.2 G;... | ANOMALY | IVI, ETHERNET | ANOMALY | VEHICLE ID : XYZ (IVI) |
| ... | ... | ... | ... | ... | ... | ... |

SERVER THAT CREATES AN ANOMALY DETECTION MODEL, RECORDING MEDIUM FOR CREATING THE ANOMALY DETECTION MODEL, AND METHOD FOR CREATING THE ANOMALY DETECTION MODEL

CROSS REFERENCE TO RELATED APPLICATIONS

This application is a U.S. continuation application of PCT International Patent Application Number PCT/JP2018/041277 filed on Nov. 7, 2018, claiming the benefit of priority of U.S. Provisional Patent Application No. 62/620,154 filed on Jan. 22, 2018 and Japanese Patent Application Number 2018-110275 filed on Jun. 8, 2018, the entire contents of which are hereby incorporated by reference.

BACKGROUND

1. Technical Field

The present disclosure relates to a V2X network in which a determination related to an anomaly is made using an anomaly detection model.

2. Description of the Related Art

Channels used by automobiles, which are becoming increasingly functionally advanced, to communicate with external entities are increasing in variety beyond just those which use mobile communication lines such as long term evolution (LTE). Implementation of technology for realizing vehicle-to-everything (V2X) networks, which are designed for communication with any entity in the surrounding area, such as other automobiles, traffic infrastructure equipment such as traffic signals, pedestrian's smartphones, is advancing with the fruition of more high-tech driving.

On the other hand, such in-vehicle network systems that receive information from an increasing number of channels including external channels are more susceptible to cyber attacks. To safely implement functionally advanced automobiles, techniques for mitigating such susceptibilities have been proposed (for example, see Japanese Unexamined Patent Application Publication No. 2017-33186, which corresponds to U.S Publication No. 2017/032671 and Japanese Unexamined Patent Application Publication No. 2017-111796, which corresponds to US Publication No. 2018/295147.

SUMMARY

However, the techniques proposed in Japanese Unexamined Patent Application Publication No. 2017-33186, which corresponds to U.S Publication No. 2017/032671 and Japanese Unexamined Patent Application Publication No. 2017-111796, which corresponds to US Publication No. 2018/295147 do not consider how a node that transmits information used to create an anomaly detection model may be affected by surrounding nodes via V2X communication in regard to such information.

In view of this, the present disclosure provides a server that creates an anomaly detection model, etc., that makes it possible to consider the affect that surrounding nodes have on the transmission source node when selecting information used to create an anomaly detection model.

A server according to one aspect of the present disclosure includes a processor; and a memory including at least one set of instructions that, when executed by the processor causes the processor to perform operations including: obtaining log information generated by a first node that is a target to be monitored on a V2X network; selecting predetermined information from the log information obtained; and performing machine learning using, as training data, the predetermined information selected, to create an anomaly detection model to be used to detect an anomaly by a monitoring node that monitors the first node on the V2X network. The log information includes, in association with one another: a time; status information indicating a status, of the first node at the time, as indicated by at least one of sensor data or control data on the first node; first anomaly information indicating whether an anomaly occurred on the first node at the time; and second anomaly information indicating whether, at the time, an anomaly occurred on a second node in a surrounding area of the first node that communicates with the first node. In the selecting, the predetermined information is selected based on the first anomaly information and the second anomaly information. In the selecting: when the first anomaly information indicates an anomaly, the status information associated with the first anomaly information indicating an anomaly in the log information is selected as the predetermined information; and when the first anomaly information indicates no anomaly and the second anomaly information indicates an anomaly, the status information associated with the first anomaly information indicating no anomaly and the second anomaly information indicating an anomaly in the log information is selected as the predetermined information, and in the performing, the anomaly detection model is created via supervised learning using, as the training data, the predetermined information selected.

A method according to one aspect of the present disclosure is executed by a server including a processor. The method includes: obtaining log information generated by a first node that is a target to be monitored on a V2X network; selecting predetermined information from the log information obtained; and performing machine learning using, as training data, the predetermined information selected, to create an anomaly detection model to be used to detect an anomaly by a monitoring node that monitors the first node on the V2X network. The log information includes, in association with one another: a time; status information indicating a status, of the first node at the time, as indicated by at least one of sensor data or control data on the first node; first anomaly information indicating whether an anomaly occurred on the first node at the time; and second anomaly information indicating whether, at the time, an anomaly occurred on a second node in a surrounding area of the first node that communicates with the first node. In the selecting, the predetermined information is selected based on the first anomaly information and the second anomaly information. In the selecting: when the first anomaly information indicates an anomaly, the status information associated with the first anomaly information indicating an anomaly in the log information is selected as the predetermined information; and when the first anomaly information indicates no anomaly and the second anomaly information indicates an anomaly, the status information associated with the first anomaly information indicating no anomaly and the second anomaly information indicating an anomaly in the log information is selected as the predetermined information, and in the performing, the anomaly detection model is created via supervised learning using, as the training data, the predetermined information selected.

General and specific aspect(s) disclosed above may be implemented using a system, a method, an integrated circuit, a computer program, or a computer-readable recording medium such as a CD-ROM, or any combination thereof.

According to the present disclosure, it is possible to take into consideration the affect that surrounding nodes have on the node that is the provider of the information when selecting information to be used to create a model for anomaly detection.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 illustrates one example of a configuration of data included in log information obtained by the anomaly determination apparatus;

FIG. 5 illustrates another example of a configuration of data included in log information obtained by the anomaly determination apparatus;

FIG. 6 illustrates yet another example of a configuration of data included in log information obtained by the anomaly determination apparatus;

Figure 1:
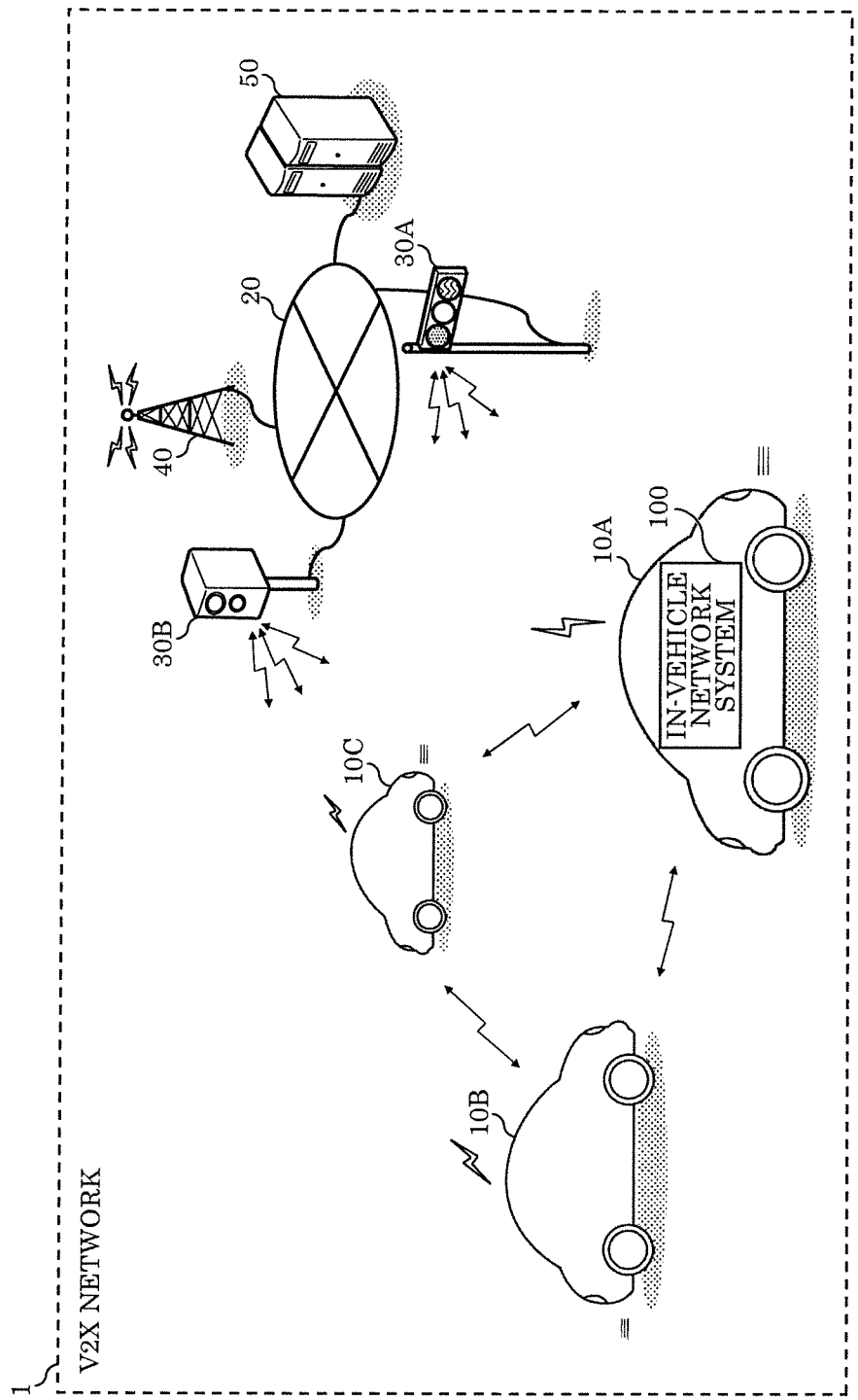
FIG. 1 illustrates an overview of a V2X network.

DETAILED DESCRIPTION OF THE EMBODIMENTS (Underlying Knowledge Forming Basis of the Present Disclosure)

Communication over a V2X network can be subdivided into a number of classifications depending on the communication partner of the vehicle. One example is vehicle-to-vehicle (hereinafter "V2V") communication. In V2V communication, for example, information indicating the speed of a first vehicle is sent in real time to a second vehicle behind the first vehicle, and that information can be used in the second vehicle to adjust the driving distance from the first vehicle or the speed of the second vehicle. Moreover, by exchanging information between an emergency vehicle responding to an emergency and general vehicles on the road, the general vehicles may be able avoid the route that the emergency vehicle will take, or the emergency vehicle may be able to avoid congested routes. Another example is vehicle-to-roadside-infrastructure (hereinafter "V2I") communication. In V2I communication, various roadside units are the communication partner of the vehicle. As used herein, a "roadside unit" refers to equipment disposed on or in the vicinity of a road as part of a traffic infrastructure system, examples of which include an electronic toll collection (ETC) gate, a traffic counter, a speed camera, and other various equipment used in computerized traffic infrastructure systems such as an intelligent transport system (hereinafter "ITS") or a universal traffic management system (hereinafter "UTMS"). Such equipment also includes equipment that originally did not include a communication function before becoming computerized, but was later retrofitted with a communication function for exchanging information with vehicles on the road. Acquiring information over the internet via a mobile communication line such as LTE or communication for accepting a service can also be considered to be one aspect of V2X as vehicle-to-cellular-network (V2N) communication.

Such provision and acquisition of information on a V2X network is done for the purpose of reinforcing safety and improving convenience on the road, as illustrated by the above examples. However, data exchanged on a V2X network is not limited to only such useful data. For example, it is possible to transmit data that causes anomalies to spread, such as false information or nefarious commands that are transmitted from a node in which an anomaly has occurred due to a cyber attack or failure and disrupt determination processes or lead to malfunction in the information processor in another node.

To reduce the occurrence and spreading of such anomalies, for example, a system is provided on the V2X network that monitors data moving through the network and detects an anomaly (hereinafter such a system is also referred to as an "anomaly monitoring system"). An anomaly monitoring system compares an anomaly detection model with the content or transmission pattern of data moving through the network, and detects an anomaly based on the difference. Here, an anomaly detection model is, for example, a normal model created or updated (hereinafter, the terminology "create" is used comprehensively; no particular distinction is made between the "creation" and "updating" of a model) through machine learning using a log of sensor data or control data collected while the vehicle is driving in a normal state. Here, the accuracy of determinations related to anomalous data is dependent on the accuracy of the anomaly detection model. For example, a normal model is created using data collected by a vehicle driving in situations in which no anomaly has occurred. Here, if an electronic control unit (ECU) that includes an anomaly determination function is connected to the in-vehicle network, the determination of whether data is data that was collected when an anomaly had occurred in the vehicle can be made by the ECU. Accordingly, it is also possible to determine whether that data should be used in the creation of the normal model, for example.

However, even if the sensor data or control data from a vehicle that performs control or detection using data received via V2X communication from surrounding nodes is data that is generated by the vehicle when no anomaly is detected, if a surrounding node was experiencing an anomaly when the data was generated, there is a possibility that the data could be affected by the anomaly. In some cases, despite the fact that an anomaly should have been determined, there is a possibility that information related to the surrounding node in which an anomaly has occurred will influence a determination of "normal". Accordingly, as more and more vehicles support V2X communication, one problem is the concern that the accuracy of the anomaly determination will decrease even with normal models created based on data from vehicles in which no anomaly has been detected.

In view of this problem, the inventors arrived at selecting, from among data collected in a V2X network, training data suitable for the creation of an intended anomaly detection model.

An anomaly determination apparatus according to one aspect of the present disclosure is included in a first node that is a target to be monitored on a V2X network, and includes a processor. The processor is configured to perform operations including: obtaining log information including: a time; and status information, the status information indicating a status, of the first node at the time, as indicated by at least one of sensor data or control data on the first node; making a first anomaly determination related to an occurrence of an anomaly on the first node at the time; making a second anomaly determination related to an occurrence of an anomaly on a second node at the time, based on second node information that is related to an anomaly in the second node and obtained from the second node, the second node being another node that is a target to be monitored on the V2X network and is in a surrounding area of the first node; when a result of the second anomaly determination indicates an occurrence of an anomaly on the second node, adding, to the log information, anomaly information indicating the occurrence of the anomaly on the second node; and transmitting the log information added with the anomaly information to at least one node on the V2X network.

This makes it possible to add information indicating whether there is a possibility of any adverse effects from a surrounding node, which is a communication partner in the surrounding area, to log information to be used as training data supplied for creating an anomaly detection model used by the anomaly monitoring system. Note that as used herein, "surrounding area" refers to a range of distance over which V2V communication or V2I communication is possible, the upper limit of which is, for example, within a range of from several tens of meters to several hundreds of meters.

Moreover, for example, the second node information may include a result of a determination related to whether an anomaly occurred or not in the second node, the determination being made in the second node based on at least one of sensor data or control data of the second node, and the second anomaly determination may be made by obtaining the result included in the second node information. Alternatively, the second node information may include at least one of sensor data or control data of the second node, and the second anomaly determination may be made based on the at least one of the sensor data or the control data included in the second node information.

In this way, information indicating whether there is a possibility of any adverse effects from a surrounding node is provided by the node that transmitted the log information or a surrounding node thereof. Moreover, for example, when the second node information includes a result of a determination indicating that an anomaly occurred in the second node, the second node information may further include a result of a determination related to a type of the anomaly that occurred in the second node. The second anomaly determination may include a determination related to a type of an anomaly that occurred, and the anomaly information may further indicate the type of the anomaly that occurred.

This makes it possible to use different training data log information depending on the machine learning method used to create the anomaly detection model.

Moreover, for example, the first node may be a vehicle including an in-vehicle network system that enables communication with another node on the V2X network. With this, in a node in which data transmitted as log information is generated, information related to whether an anomaly occurred in a surrounding node thereof is obtained. It is easier to ensure accuracy with information obtained in this manner than when a determination of whether an anomaly occurred or not is made after the fact based on information functioning as circumstantial evidence in, for example, a training data generating server. Moreover, it is possible to relieve the load placed on the training data generating server, which collects a large amount of information.

Moreover, for example, in the transmitting, the log information may be transmitted to a node that creates, using the log information, an anomaly detection model used by a monitoring system on the V2X network to detect an anomaly.

This makes it possible to create an anomaly detection model that uses, as training data, log information that can be selectively used based on whether or not an anomaly occurred in a surrounding node of each node.

A server according to one aspect of the present disclosure includes a processor. The processor is configured to perform operations including: obtaining log information generated by a first node that is a target to be monitored on a V2X network; selecting predetermined information from the log information obtained; and performing machine learning using, as training data, the predetermined information selected, to create an anomaly detection model to be used to detect an anomaly by a monitoring node that monitors the first node on the V2X network. The log information includes, in association with one another: a time; status information indicating a status, of the first node at the time, as indicated by at least one of sensor data or control data on the first node; first anomaly information indicating whether an anomaly occurred on the first node at the time; and second anomaly information indicating whether, at the time, an anomaly occurred on a second node in a surrounding area of the first node that communicates with the first node. In the selecting, the predetermined information is selected based on the first anomaly information and the second anomaly information.

This makes it possible to create an anomaly detection model by machine learning using, in the training data, log information that includes information indicating whether there is a possibility of any adverse effects caused by an anomaly in a surrounding node.

Moreover, in the selecting, status information associated with the first anomaly information that indicates there is no anomaly and the second anomaly information that indicates there is no anomaly may be selected as the predetermined information, and in the performing, a normal model may be created as the anomaly detection model using, as the training data, the predetermined information selected. Alternatively, in the selecting, status information associated with at least one of the first anomaly information that indicates there is an anomaly or the second anomaly information that indicates there is an anomaly may be selected as the predetermined information, and in the performing, the anomaly detection model may be created via supervised learning using, as the training data, the predetermined information selected.

This makes it possible to use different machine learning methods depending on the information indicating whether or not an anomaly occurred that is added to the log information, and thus makes it possible to obtain a more accurate anomaly detection model that can perform anomaly detection.

A program according to one aspect of the present disclosure is executed by a processor included in an anomaly determination apparatus included in a first node that is a target to be monitored on a V2X network. The program, in response to being executed by the processor, causes the anomaly determination apparatus to perform operations including: obtaining log information including: a time; and status information, the status information indicating a status, of the first node at the time, as indicated by at least one of sensor data or control data on the first node; making a first anomaly determination related to an occurrence of an anomaly on the first node at the time; making a second anomaly determination related to an occurrence of an anomaly on a second node at the time, based on second node information that is related to an anomaly in the second node and obtained from the second node, the second node being another node that is a target to be monitored on the V2X network and is in a surrounding area of the first node; when a result of the second anomaly determination indicates an occurrence of an anomaly on the second node, adding, to the log information, anomaly information indicating the occurrence of the anomaly on the second node; and transmitting the log information added with the anomaly information to at least one node on the V2X network.

This makes it possible to add information indicating whether there is a possibility of any adverse effects from a surrounding node to log information to be used as training data supplied for creating an anomaly detection model used by the anomaly monitoring system.

A program according to one aspect of the present disclosure is executed by a processor included in a server. The program, in response to being executed by the processor, causes the server to perform operations including: obtaining log information generated by a first node that is a target to be monitored on a V2X network; selecting predetermined information from the log information obtained; and performing machine learning using, as training data, the predetermined information selected, to create an anomaly detection model to be used to detect an anomaly by a monitoring node that monitors the first node on the V2X network. The log information includes, in association with one another: a time; status information indicating a status, of the first node at the time, as indicated by at least one of sensor data or control data on the first node; first anomaly information indicating whether an anomaly occurred on the first node at the time; and second anomaly information indicating whether, at the time, an anomaly occurred on a second node in a surrounding area of the first node that communicates with the first node. In the selecting, the predetermined information is selected based on the first anomaly information and the second anomaly information.

This makes it possible to create an anomaly detection model by machine learning using, in the training data, log information that includes information indicating whether there is a possibility of any adverse effects caused by an anomaly in a surrounding node.

Note that each of the following embodiments shows a specific example. The numerical values, shapes, elements, steps, the processing order of the steps, etc. shown in the following embodiments are mere examples, and thus are not intended to limit the present disclosure. Furthermore, among the elements described in the following embodiments, those not recited in any one of the independent claims are described as optional elements. Moreover, barring any discrepancies, combinations of content in each of the embodiments and variations thereof fall within the technical scope of the present disclosure.

Embodiment

[1. V2X Network Overview]

First, an overview of a V2X network to which the techniques of the present disclosure are applicable will be given. FIG. 1 illustrates an overview of a V2X network.

Nodes on V2X network 1 include vehicles 10A, 10B, and 10C, traffic signal 30A, vehicle speed measurement instrument 30B, base station 40, and anomaly monitoring server 50. Hereinafter, vehicles 10A, 10B, and 10C may collectively be referred to as "vehicles 10", or when there is no particular need for distinction, one or more of vehicles 10A, 10B and 10C may simply be referred to as "vehicle 10" or "vehicle(s) 10". Moreover, traffic signal 30A and vehicle speed measurement instrument 30B may collectively be referred to as "roadside units 30", or when there is no particular need for distinction, one or the other may simply be referred to as "roadside unit 30".

Vehicles 10 perform V2V communication between themselves and V2I communication with roadside units 30, and transmit and receive data using a predetermined message set, such as basic safety message (BSM). Vehicles 10 also connect to communication network 20 such as the internet via base station 40 and perform V2N communication with anomaly monitoring server 50. A log including content indicating communication data on in-vehicle network system 100 included in vehicle(s) 10, such as sensor data or control data, is transmitted from vehicle(s) 10 to anomaly monitoring server 50.

Data that can be used to detect an anomaly in in-vehicle network system 100, such as an anomaly detection model executed in the vehicle to detect an anomaly, is transmitted from anomaly monitoring server 50 to vehicles 10. Note that this anomaly detection model is created by machine learning using the log transmitted from vehicles 10 as training data. Moreover, in this example, data may be exchanged between roadside units 30 and anomaly monitoring server 50 as well. For example, system communication data of roadside units 30 is transmitted from roadside units 30 to anomaly monitoring server 50, and an anomaly detection model that can be used by roadside units 30 to detect an anomaly is transmitted from anomaly monitoring server 50 to roadside units 30.

In V2X network 1, vehicles 10 are targets to be monitored by anomaly monitoring server 50. More specifically, anomaly monitoring server 50 performs anomaly detection on data sent from vehicles 10 to V2X network 1 to detect anomalies resulting from a cyber attack or failure, and determines whether or not an anomaly occurred in vehicles 10. Roadside units 30 are also targets to be monitored by anomaly monitoring server 50, but roadside units 30 also have, in addition to their original function, i.e., as a traffic signal or a vehicle speed measurement instrument, a function of monitoring other nodes, and thus monitor vehicles 10. In this way, it can be said that the anomaly monitoring system is built from a plurality of nodes performing different functions in V2X network 1.

[2. Node Configuration]

Next, from among the various nodes that make up V2X network 1, the configurations of vehicles 10, roadside units 30, and anomaly monitoring server 50 will be described.

[2-1. Vehicles]

Figure 2:
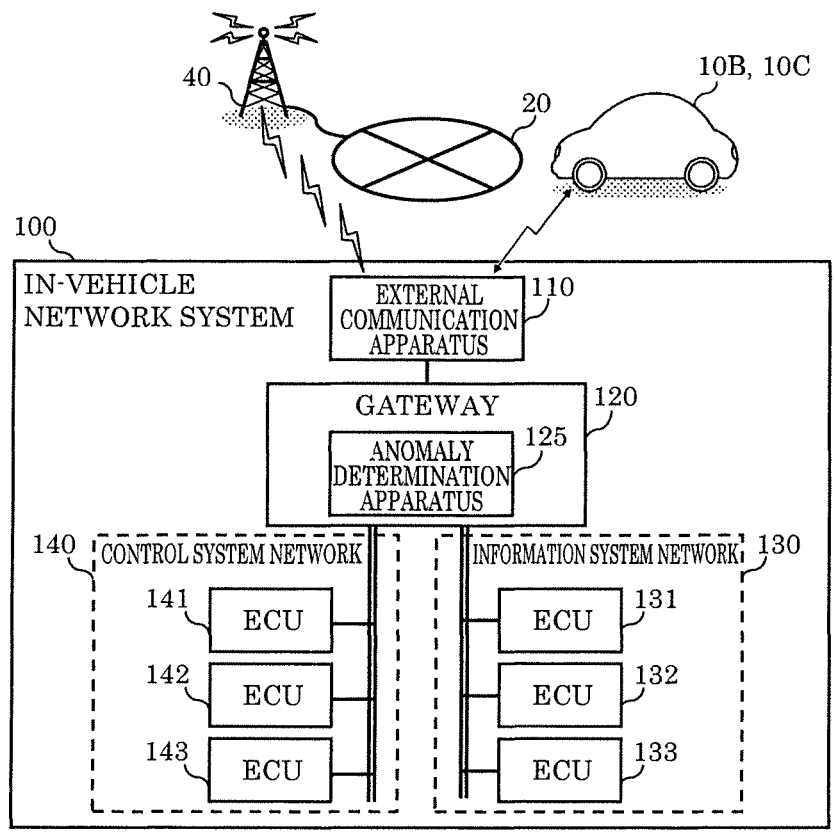
FIG. 2 is a block diagram illustrating an example of a configuration of an in-vehicle network system included in an automobile according to an embodiment.

Each vehicle 10 includes an in-vehicle network system capable of performing V2X communication like described above with another node. FIG. 2 is a block diagram illustrating the configuration of in-vehicle network system 100 included in vehicle 10A, which is one example of the in-vehicle network system included in vehicles 10.

For example, in-vehicle network system 100 is a system that, at least partially, is built and operates in accordance with controller area network (CAN) standards, and includes: external communication apparatus 110; gateway 120 that relays data in and out of vehicle 10 as well as between the networks of the respective functional systems; and information system network 130 and control system network 140, which are the functional system networks. Note that information system network 130 and control system network 140 are non-limiting examples of functional system networks that can be included in in-vehicle network system 100. Moreover, the techniques according to the present disclosure are applicable to network systems that are not divided per functional system. The techniques are also applicable to a system on a network that is based on a set of standards other than CAN, such as Ethernet (registered trademark), or a network system in which parts based on different sets of standards, such as CAN and Ethernet, coexist.

External communication apparatus 110 is an interface that communicates with nodes other than vehicle 10A on V2X network 1, including vehicle 10B and 10C, roadside units 30 (omitted in FIG. 2), and base station 40, and is implemented as a communication module that is compatible with a variety of communication standards used in V2X communication.

Gateway 120 is implemented as an ECU having the function of relaying data described above. Moreover, gateway 120 functionally includes anomaly determination apparatus 125 (to be described later) that can be implemented on the ECU.

Figure 3:
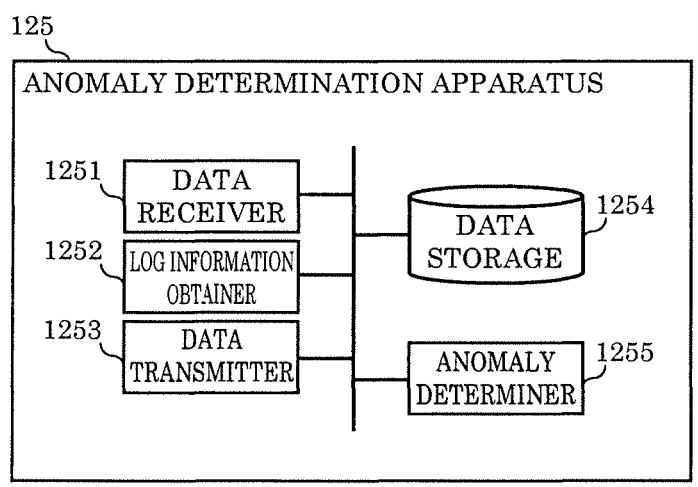
FIG. 3 is a block diagram illustrating an example of a configuration of an anomaly determination apparatus included in the in-vehicle network system.

Information system network 130 includes a bus line, which is indicated in the drawing by a double line, and ECUs 131, 132, and 133 connected to the bus line. Control system network 140 includes a bus line and ECUs 141, 142 and 143 connected to the bus line. Each ECU is connected with a device (not illustrated in the drawing) such as a sensor or actuator, via an interface different from the interface connected to the bus line. Sensor data obtained by measurements performed by a sensor is, for example, used inside the ECU, and/or output to a bus line for use by another ECU. An ECU connected with an actuator controls the actuator in accordance with information indicated by such sensor data or in accordance with control data obtained from another ECU via a bus line. In in-vehicle network system 100, such sensor data or control data is also received by gateway 120, and is subject to anomaly detection by anomaly determination apparatus 125 included in gateway 120. FIG. 3 is a block diagram illustrating an example of a functional configuration of anomaly determination apparatus 125.

Anomaly determination apparatus 125 determines whether an anomaly occurred in in-vehicle network system 100 or not (anomaly determination). Various methods can be used for the processing performed in the anomaly determination, examples of which include a method based on one or both of the transmission pattern and data content of a data frame, a method that uses a message authentication technique such as message authentication code (MAC), a method that uses the anomaly detection model described above, or any combination thereof. An example of a configuration of anomaly determination apparatus 125 is illustrated in the block diagram of FIG. 3.

Anomaly determination apparatus 125 includes data receiver 1251, log information obtainer 1252, data transmitter 1253, data storage 1254, and anomaly determiner 1255.

Data receiver 1251 receives sensor data or control data transmitted in in-vehicle network system 100.

Log information obtainer 1252 associates the content of data received by data receiver 1251 with information obtained from a timer (not illustrated in the drawings) indicating the time of reception of the data, and stores the associated data as log information in data storage 1254. One example of the configuration of the data included in the log information stored in data storage 1254 in this manner is illustrated in FIG. 4. In each row in the example illustrated in FIG. 4, the time obtained from the timer is stored in the "time" column, and the content of the data received by data receiver 1251 is stored in the "in-vehicle status information", and this information is stored in association with each other. The content of the data stored as log information is exemplified in FIG. 4 as speed and acceleration, but the content of the data is not limited to this example. Various types of information can be stored in a time series as log information, examples of which include measurement values measured by sensors included in vehicle 10, such as yaw rate, current gear, steering angle, engine speed, accelerator pedal position, etc., determination values indicating a determination made based on these measurement values, and control instructions made. In the example herein, position information for vehicle 10A at the corresponding time is further stored in the log information. Such position information can be provided from, for example, a reception module of a measurement system included in, for example, a car navigation system or a smartphone connected to in-vehicle network system 100.

Anomaly determiner 1255 makes a determination related to whether an anomaly occurred or not in in-vehicle network system 100 at the time indicated in the log information stored in data storage 1254. This anomaly determination is made via at least one of the various methods described above, using, for example, the content of the sensor data or control data included in the log information, or some other information in in-vehicle network system 100. Anomaly determiner 1255 adds the result of the anomaly determination to the log information. One example of the configuration of the data included in log information added with such an anomaly determination result is illustrated in FIG. 5. In each row in the example illustrated in FIG. 5, the result of the anomaly determination in vehicle 10A at the corresponding time included in the stored log information is stored in the "in-vehicle anomaly determination" column. Furthermore, in this example, when the result of the anomaly determination indicates that an anomaly had occurred (see the rows where the value in the "in-vehicle anomaly determination" column is "anomaly"), the location of the occurrence of that anomaly is stored as information regarding the type of anomaly (see the "in-vehicle anomaly type" column). In this way, anomaly determiner 1255 may obtain further detailed information related to the anomaly that occurred, and add this information to the log information.

Anomaly determiner 1255 also makes an anomaly determination based on information obtained from a surrounding node via V2V communication or V2I communication, and further adds the result of this anomaly determination to the log information. One example of the configuration of the data included in log information added with such an anomaly determination result from another node is illustrated in FIG. 6. In each row in the example illustrated in FIG. 6, the result of the determination of whether an anomaly occurred in a surrounding node of vehicle 10A at the corresponding time included in the stored log information is stored, in association with all the other information in the same row, in the "surrounding node anomaly determination" column. Furthermore, in this example, when the result of the anomaly determination indicates that an anomaly occurred (see the rows where the value in the "surrounding node anomaly determination" column is "anomaly"), information indicating the node in which the anomaly occurred or information indicating the node and the location of the occurrence of the anomaly on the node is stored in association as information regarding the type of anomaly (see the "surrounding node anomaly type" column). However, an anomaly in another node that is associated with a time may be an anomaly that occurred or was detected within a predetermined period around that time (for example within a few seconds to one minute of that time); the occurrence or detection of the anomaly and the associated time are not required to be precisely synchronous. Moreover, so long as time-based conditions are satisfied, a plurality of items of information related to anomaly determination for surrounding nodes may be associated with an in-vehicle anomaly corresponding to one time. Anomaly determination for a surrounding node will be described later.

Note that for the sake of convenience, in the present specification, log information including not only the in-vehicle status information associated with times like in FIG. 4, but information related to anomalies in the host node or a surrounding node added by anomaly determiner 1255 like the information in FIG. 5 or FIG. 6 as well may be referred to simply as a "log". Moreover, in the V2X network, each vehicle 10 which is a target to be monitored by anomaly monitoring server 50 is one example of a first node according to this embodiment, and a surrounding node that communicates with a first node is one example of a second node according to this embodiment. The second node may also be a target to be monitored by anomaly monitoring server 50.

Moreover, in FIG. 4 through FIG. 6, all the stored, associated information in a single line may be collectively referred to as a record. For example, each record in the log illustrated in FIG. 6 includes, at a given time that is not necessarily exact: the status of a node (for example, vehicle 10A) based on the position, sensor data or control data thereof; the result of the determination of whether there is an anomaly in that node or not, and if there is, the type of anomaly; and the result of the determination of whether there is an anomaly in a surrounding node or not, and if there is, the type of anomaly.

Data storage 1254 is where the data in the log information described above is stored.

Data transmitter 1253 transmits the result of the anomaly determination for in-vehicle network system 100 made by anomaly determiner 1255 to, for example, a surrounding node via external communication apparatus 110 by way of V2V communication or V2I communication. The result of this anomaly determination by data transmitter 1253 may be transmitted after each determination is made, or may be transmitted at regular intervals. Moreover, the determination results may be transmitted only when the result is that an anomaly has been detected. Information transmitted to a surrounding node includes at least whether or not an anomaly occurred, and may further include the type of anomaly, corresponding time, or an ID that uniquely identifies vehicle 10A. Moreover, data transmitter 1253 transmits data included in the log information stored in data storage 1254 to anomaly monitoring server 50 via external communication apparatus 110 by way of V2N communication. Log information provided to anomaly monitoring server 50 from vehicle(s) 10 in this manner is used as training data for machine learning for the purpose of creating an anomaly detection model to be used in the anomaly determination in anomaly monitoring server 50.

In the example presented in this embodiment, anomaly determination apparatus 125 configured as described above is implemented by a predetermined program being executed by a processor in a microcontroller in the ECU that implements the gateway 120, data being written into memory, time information being obtained from a timer, and data being transmitted and received from an input/output unit. Note that the implementation of anomaly determination apparatus 125 is not limited to this example. For example, anomaly determination apparatus 125 may be implemented as part or all of some device like an ECU other than the gateway that is connected to in-vehicle network system 100. Moreover, for example, the functions of each of the elements included in anomaly determination apparatus 125 described above may be implemented by being divided up and assigned to a group of various devices such as a plurality of ECUs and storage devices on in-vehicle network system 100.

Note that elements (not illustrated in the drawings) in vehicle 10A which are related to the driving of the automobile and controlled by control system network 140, such as the driveline, are omitted from the description since they are not significantly relative to the anomaly monitoring techniques according to the present embodiment.

Next, anomaly determination for vehicles 10 that are surrounding nodes will be described in greater detail. Just like vehicle 10A, vehicle 10B and 10C are also capable of including an in-vehicle network system that is capable of communicating in V2X network 1. For example, if vehicle 10B includes anomaly determination apparatus 125 just like vehicle 10A, vehicle 10A can receive a result of an anomaly determination made by vehicle 10B, and can determine whether an anomaly occurred or not in a surrounding node based on the result. Moreover, if the information received from vehicle 10B includes information related to the type of anomaly that occurred, vehicle 10A can make a determination related the type of anomaly that occurred in a surrounding node based on this information. In any case, in principle, the determination should be made in accordance with the result indicated in the received information.

However, all in-vehicle network systems in vehicles 10 connected to V2X network 1 do not necessarily always function the same as in-vehicle network system 100 described above. For example, a case in which anomaly determination apparatus 125 included in vehicle 10B, which is the same anomaly determination apparatus 125 included in vehicle 10A, fails is conceivable, and a case in which the in-vehicle network system included in vehicle 10C lacks the same functions as anomaly determination apparatus 125 is conceivable. In other words, in these cases, vehicle 10A cannot receive an anomaly determination result from vehicle 10B and vehicle 10C. In such cases, the information transmitted to surrounding nodes from vehicle 10B and vehicle 10C may be information indicating in-vehicle status that does not include an anomaly determination result, such as the information included in the rows in the list illustrated in FIG. 4. In vehicle 10A, which is the surrounding node that received such information, anomaly determiner 1255 determines whether an anomaly occurred or not based on the received information indicating the status of vehicle 10B or vehicle 10C, just like anomaly determiner 1255 makes the determination regarding an anomaly on in-vehicle network system 100. Anomaly determiner 1255 may also further make the determination regarding the type of anomaly that occurred in the surrounding node.

Note that apart from the above, information related to an anomaly in vehicle 10 that is a surrounding node may be obtained via roadside units 30 as well. This will be described later.

In either case, in an in-vehicle network system including a function or functions corresponding to anomaly determination apparatus 125, the obtaining of information indicating the status of the host vehicle, the determining of whether there is an anomaly in the host vehicle or not, and the determining of whether there is an anomaly in a surrounding node performed by anomaly determiner 1255, are, for example, repetitively performed at regular intervals to generate the data included in the log information configured like illustrated in FIG. 6. This information is then transmitted to anomaly monitoring server 50 via data transmitter 1253.

[2-2. Roadside Units]

It goes without saying that each roadside unit 30 functions as originally designed, as described above. In other words, in the example illustrated in FIG. 1, among roadside units 30, traffic signal 30A functions as a traffic signal, and vehicle speed measurement instrument 30B functions as a vehicle speed measurement instrument. However, roadside units 30 according to this embodiment additionally function as monitoring nodes that monitor other nodes, and thus monitor vehicles 10. Hereinafter, the configuration of a roadside unit 30 for implementing the function of monitoring other nodes will be described.

Figure 7:
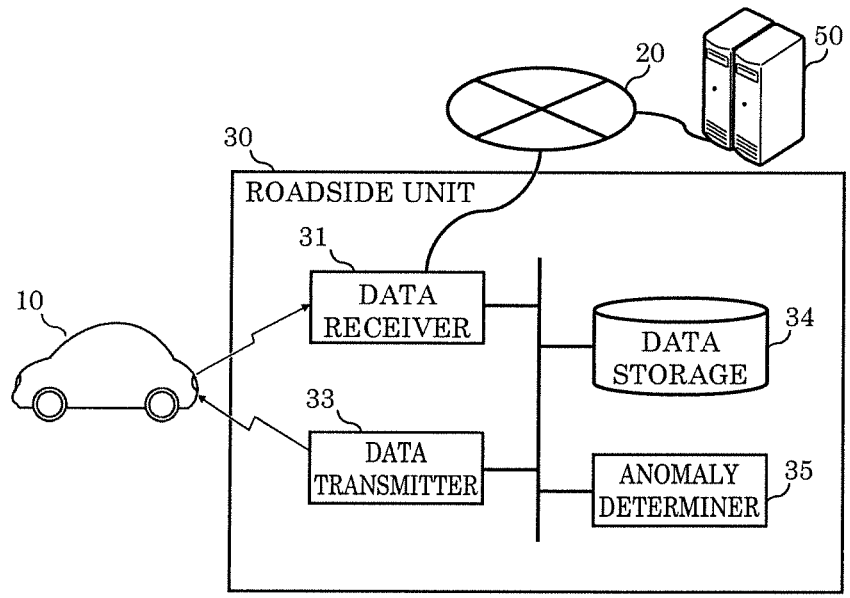
FIG. 7 is a block diagram illustrating an example of a configuration of a roadside unit on the V2X network.

FIG. 7 is a block diagram illustrating an example of a configuration of roadside unit 30 on V2X network 1. Roadside unit 30 includes data receiver 31, data transmitter 33, data storage 34, and anomaly determiner 35.

Data receiver 31 and data transmitter 33 are interfaces that communicate with nodes other than roadside units 30 on V2X network 1, such as vehicles 10 and anomaly monitoring server 50, and are implemented as communication modules that are compatible with a variety of communication standards used in V2X communication. Data storage 34 is implemented as a storage device for the information processing system included in roadside unit 30, and anomaly determiner 35 is implemented by a processor in the information processing system executing a program.

Data receiver 31 obtains, for example, an anomaly detection model used to detect an anomaly from anomaly monitoring server 50 via communication network 20. Data receiver 31 also receives data included in the log information from vehicle 10. Here, the data included in log information that is transmitted from vehicle 10 can assume any one of the data configurations illustrated in FIG. 4 through FIG. 6, depending on the status of vehicle 10.

Anomaly determiner 35 uses the anomaly detection model to make an anomaly determination for vehicle 10 based on the log information. The anomaly determination made by anomaly determiner 35 corresponds to the anomaly determination for another node made by anomaly determiner 1255 in anomaly determination apparatus 125 in vehicle 10. Anomaly determiner 35 also makes an anomaly determination that corresponds to the anomaly determination for the host node made by anomaly determiner 1255, that is to say, the anomaly determination for the system within roadside unit 30.

The anomaly detection model and the log information received by data receiver 31, as well as the data included in the log information added with information related to the anomaly determination for the host node or another node by anomaly determiner 35, are stored in data storage 34.

Information related to the anomaly determination is transmitted to vehicle 10 via data transmitter 33. Note that here, the vehicle 10 that obtains the information related to the anomaly determination from roadside unit 30 is not limited to the vehicle 10 that is the sender of the above-described data included in the log information, and may be some other vehicle 10 corresponding to another surrounding node.

In other words, the determination of whether an anomaly occurred or not based on information indicating the status of each vehicle 10 can be made by the host node or some other vehicle 10 or roadside unit 30 that is another surrounding node. Moreover, each vehicle 10 obtains the result of an anomaly determination of some other vehicle 10 that is another surrounding node based on the determination result or status information obtained from that surrounding node, or based on the determination result obtained from roadside unit 30 that is a surrounding node which acts as a third party.

In V2X network 1, a model for detecting an anomaly is created via machine learning that uses log information collected from vehicles 10, which are target nodes to be monitored. Here, the log information indicates the status of each vehicle 10 in a time series. Here, the status of vehicle 10 or anomaly determination result corresponding to each time in each record in the log might be affected by information related to a surrounding node that experienced an anomaly. Distinguishing between records that have been affected by such information and records that have not been affected by such information before using the records as training data produces an anomaly detection model that yields more accurate anomaly determinations. With conventional log information, the presence or absence of an anomaly in a surrounding node is determined using the time and position indicated in the log information collected from each node at the time of selecting the training data to be used. However, this method places a great processing load on the information processing apparatus that performs the processing for selecting the training data from among the large amount of accumulated logs, and the accuracy of the determination of whether an anomaly occurred or not in a surrounding node is uncertain. In view of this, as described above, by causing vehicle 10 to collect and add, to the log information, the result of the determination of whether an anomaly occurred or not in a surrounding node via a variety of means, at the actual location and time of the collection of the log information by vehicle 10, it is possible to associate, with the log information, information that is more accurate that when the determination is made by anomaly monitoring server 50 regarding an anomaly in a surrounding node, and moreover, it is possible to reduce the processing load in the selecting of the training data from among the accumulated logs.

Note that ideally, the data in all logs collected from vehicles 10 has a format like that illustrated in FIG. 6, because the load placed on the information processing apparatus in the selecting of the training data is greatly reduced. However, with the method described above, even in this transitional period in which vehicles 10 that provide logs added with information related to the presence or absence of an anomaly for the host node or for the host node and a surrounding node are in the midst of becoming widespread in use, stated differently, in this transitional period in which a mixture of the log data formats in FIG. 4 through FIG. 6 are in current use, among them, those logs having the format illustrated in FIG. 6 aid in reducing the processing load for the selecting of the training data by the information processing apparatus.

The information processing apparatus that so selects the training data in this way may be an apparatus that is dedicated to this selecting processing, but in the example present in this embodiment, anomaly monitoring server 50 performs a variety of processes, including the collection of logs, the selection of training data, the creation of the anomaly detection model, and the monitoring via the anomaly determination that uses the anomaly detection model. Next, the configuration of anomaly monitoring server 50 will be described.

[2-3. Anomaly Monitoring Server]

Figure 8:
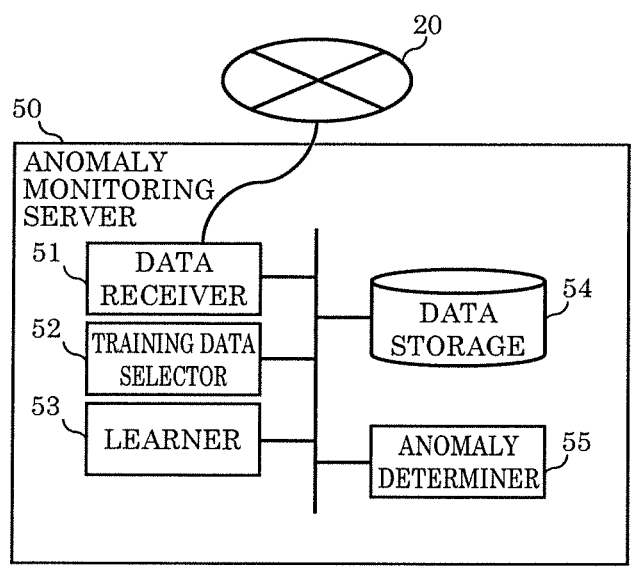
FIG. 8 is a block diagram illustrating an example of a configuration of an anomaly monitoring server on the V2X network.

FIG. 8 is a block diagram illustrating an example of a configuration of anomaly monitoring server 50 on V2X network 1.

Anomaly monitoring server 50 includes data receiver 51, training data selector 52, learner 53, data storage 54, and anomaly determiner 55.

Data receiver 51 receives, via V2X network 1, data from each node that is a target to be monitored.

Training data selector 52 selects data to be used as training data from the received log. For example, only those records determined to be "normal" in both in-vehicle and surrounding node columns are selected as training data for normal model creation.

Learner 53 creates an anomaly detection model by learning using the training data selected by training data selector 52.

Data storage 54 stores the log received by data receiver 51 and the anomaly detection model created by learner 53.

Anomaly determiner 55 reads the anomaly detection model stored in data storage 54, and uses the anomaly detection model to perform anomaly detection and determination (simply referred to as "anomaly determination" in some instances in the specification). Note that there are two types of anomaly determination, depending on the application. The first type of anomaly determination is made when the log that is received is a log that does not include an anomaly determination result from a target node to be monitored, like the log illustrated in FIG. 4, and is made for the purpose of obtaining the determination results that can be used in the selection of the training data for anomaly detection model creation from such a log. The second type of anomaly determination is made for the purpose of monitoring V2X network 1 on the various data transmitted from target nodes to be monitored.

Although omitted from the illustration in FIG. 8, anomaly monitoring server 50 may further include a transmitter, and the created anomaly detection model may be transmitted from the transmitter to the nodes that determine anomalies in the host node or surrounding nodes, as described above.

Anomaly monitoring server 50 configured in such a manner is implemented as one or more computers including a communication module, a storage device, and a processor that executes a predetermined program. When implemented as two or more computers, they may be disposed in a single location, or may be disposed in different locations and transmit and receive data to and from each other over a communication network such as the Internet.

The sequence of processes executed in anomaly monitoring server 50 will be described later.

[3. Processes in Target Node to be Monitored and Flow of Data in V2X Network]

Next, the sequence of processes in a target node to be monitored on V2X network 1 and the flow of data therein according to the present embodiment will be described with reference to related art.

[3-1. Cases in Which Determinations Related to Anomalies in Other Nodes Are Not Handled In-Vehicle]

Figure 9:
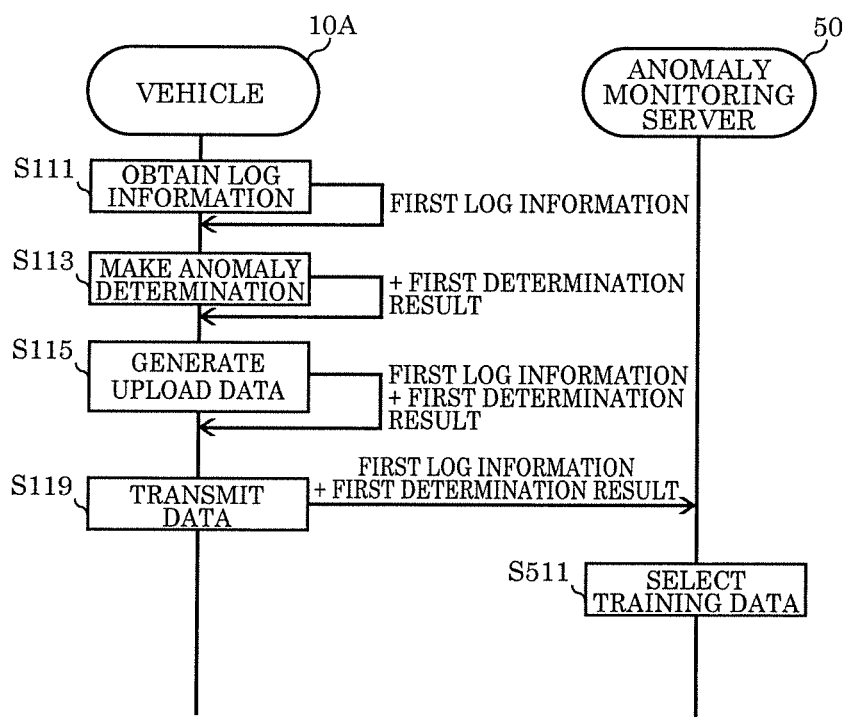
FIG. 9 is a sequence chart illustrating one example of a sequence of processes related to uploading data from a vehicle that is a target node to be monitored to the anomaly monitoring server.

FIG. 9 is a sequence chart illustrating one example of a sequence of processes related to uploading data from vehicle 10A, which is a target node to be monitored, to anomaly monitoring server 50. Note that this example supposes that vehicle 10A does not make anomaly determinations for surrounding nodes due to functional reasons or because no surrounding node that vehicle 10A can communicate with is present.

In vehicle 10A, log information obtainer 1252 obtains log information indicating in-vehicle status by receiving data transmitted along the bus by the ECUs in in-vehicle network system 100 (S111). Here, the log information indicating the in-vehicle status of vehicle 10A is also referred to as first log information in order to distinguish it from other log information hereafter. Log information having the exemplary data configuration illustrated in FIG. 4 can said to be the log information at this phase.

Next, anomaly determiner 1255 makes an anomaly determination regarding the in-vehicle status of vehicle 10A (S113). The determination result is added to the first log information. Log information having the exemplary data configuration illustrated in FIG. 5 can said to be the log information at this phase. In this example, when an anomaly is detected and it is determined that an anomaly occurred in vehicle 10A, anomaly determiner 1255 further identifies, as an anomaly type, the location in which the anomaly occurred, and adds the result to the first log information. The result of the determination related to the anomaly in vehicle 10A is also referred to as a first determination result in order to distinguish it from other determination results hereafter. However, note that the first determination result need only include at least the determination result related to the occurrence of an anomaly; the information related to the type of anomaly is not required. In this way, data (a log) to be uploaded to anomaly monitoring server 50, whose contents consist of the first log information added with the first determination result, is generated by anomaly determiner 1255 (S115). The data generated in step S115 is then transmitted to anomaly monitoring server 50 via data transmitter 1253 (S119).

After anomaly monitoring server 50 has received the data included in the log information generated in the above manner in vehicle 10A, which is a target node to be monitored, training data selector 52 in anomaly monitoring server 50 uses information indicating the time and position of vehicle 10A included in the records in the data to search the large amount of logs received from other nodes for nodes in which an anomaly occurred that might have affected the status of vehicle 10A. The result of this search allows training data selector 52 to differentiate between records in the logs that are affected by an anomaly in a surrounding node and records that are not affected, and select records according to the application (S511). Note that a significant amount of processing is required by the anomaly monitoring server 50 in order to perform the processes from the searching processes to the selecting process. In a conventional anomaly monitoring server 50 that collects only data that does not include information regarding surrounding nodes, like the data illustrated in FIG. 4, it is possible to perform processing for all records in the received logs.

[3-2. Cases in Which Vehicles Collect Determination Results Related to Anomalies in Other Nodes]

Figure 10:
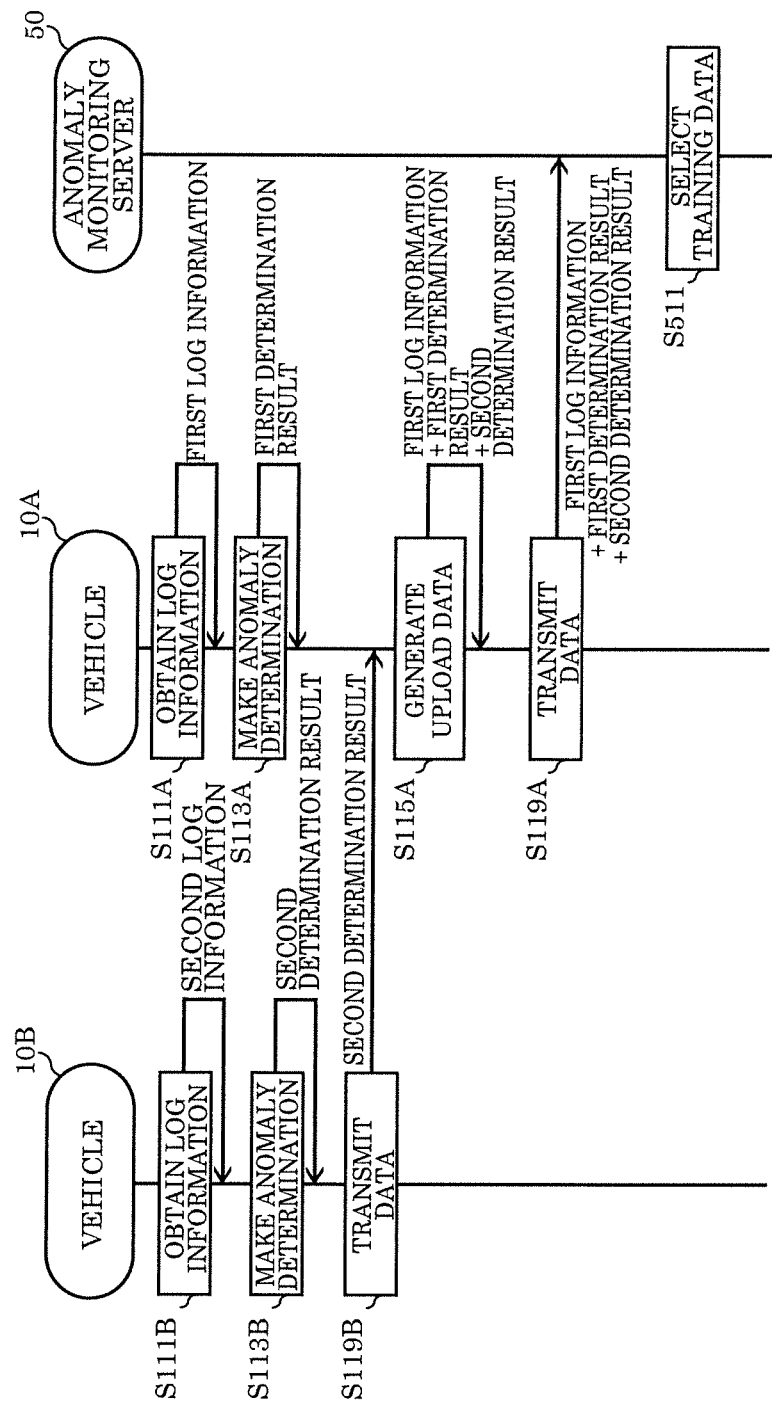
FIG. 10 is a sequence chart illustrating another example of a sequence of processes related to uploading data from a vehicle that is a target node to be monitored to the anomaly monitoring server.

FIG. 10 is a sequence chart illustrating one example of a sequence of processes related to uploading data from vehicle 10A, which is a target node to be monitored, to anomaly monitoring server 50. This example assumes that vehicle 10B, which is a node in the surrounding area of vehicle 10A, includes, in the in-vehicle network system thereof, an anomaly determination apparatus corresponding to anomaly determination apparatus 125 illustrated in FIG. 3. The example in FIG. 10 differs from the example in FIG. 9 in that vehicle 10A obtains the result of an anomaly determination made in vehicle 10B, from vehicle 10B.

In vehicle 10A, the obtainment of log information performed by log information obtainer 1252 (S111A) and the anomaly determination (S113A) respectively correspond to steps S111 and S113 in the sequence of processes illustrated in FIG. 9. At this stage, first log information added with determination results (first determination results) illustrated in FIG. 5 is stored in data storage 1254.

In vehicle 10B, processing is performed for obtaining log information (S111B) that corresponds to step S111A performed in vehicle 10A. Hereinafter, the log information indicating the in-vehicle status of vehicle 10B is also referred to as second log information in order to distinguish it from the first log information described above. The data configuration example illustrated in FIG. 4 can also be said to be an example of the data configuration of second log information.

Next, in vehicle 10B, an in-vehicle anomaly determination (S113B) that corresponds to step S113A performed in vehicle 10A is made. The result of the determination related to the anomaly in vehicle 10B is also referred to as a second determination result in order to distinguish it from the first determination result hereinafter. Just like the first determination result, it is sufficient so long as the second determination result includes at least the result of the determination related to the occurrence of an anomaly, and may additionally include information related to the type of anomaly.

Next, a second determination result is transmitted from vehicle 10B to vehicle 10A (S119B). After data receiver 1251 receives the second determination result in vehicle 10A, anomaly determiner 1255 adds the second determination result to the first log information, whereby data (a log) to be uploaded to anomaly monitoring server 50, whose contents consist of the first log information added with the first determination result and the second determination result, is generated by anomaly determiner 1255 (S115A). This data has the configuration illustrated in FIG. 6. In other words, this data includes, associated with one another, (i) the in-vehicle status information and the in-vehicle anomaly determination result for vehicle 10A, which is the host node, and (ii) the anomaly determination result for vehicle 10B, which is a surrounding node. The data generated in step S115A is then transmitted to anomaly monitoring server 50 via data transmitter 1253 (S119A).

Figure 11:
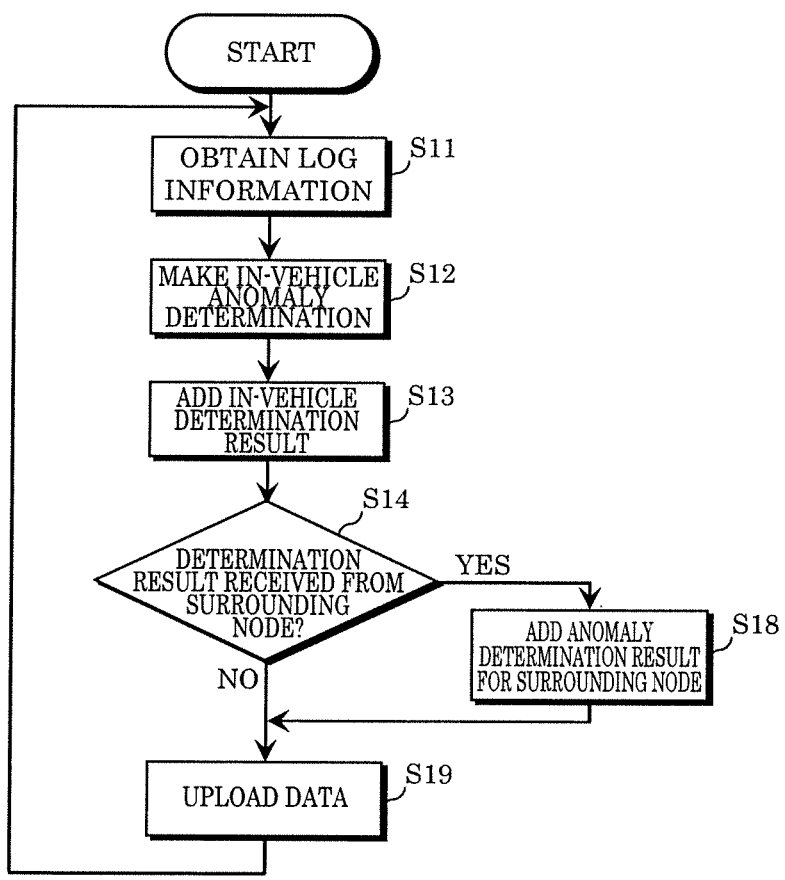
FIG. 11 is a flow chart illustrating one example of a sequence of processes performed by an anomaly determination apparatus according to an embodiment.

FIG. 11 is a flow chart illustrating one example of a sequence of the processes performed by anomaly determination apparatus 125 in vehicle 10A that are described in the above example. In anomaly determination apparatus 125, data receiver 1251 obtains log information (the first log information in FIG. 10) from data moving through in-vehicle network system 100 (S11). Once the log information is obtained, anomaly determiner 1255 makes an anomaly determination based on the anomaly detection performed in vehicle 10A at the time of obtainment of the log information (S12). The result of the anomaly determination (the first determination result in FIG. 10) is added in the log information so as to be associated with the log information, for example, the result is stored in the same record (S13). Next, anomaly determiner 1255 determines whether an anomaly determination result from a surrounding node (second determination result in FIG. 10) has been obtained within a predetermined period of time (S14). When an anomaly determination result is received (yes in S14), anomaly determiner 1255 additionally adds the second determination result to the data (S18), and data transmitter 1253 uploads the data to anomaly monitoring server 50 (S19). When an anomaly determination result is not received (no in S14), data transmitter 1253 uploads the first log information not added with second determination result to anomaly monitoring server 50 (S19). In vehicle 10A, the sequence of processes illustrated in FIG. 11, for example, repeatedly executed at a regular interval.

Referring back to FIG. 10, after anomaly monitoring server 50 receives data included in the log information generated as described above in vehicle 10A, which is a target node to be monitored, training data selector 52 in anomaly monitoring server 50 differentiates between records affected by an anomaly in a surrounding node and records not affected by a surrounding node, based on the anomaly determination result information regarding surrounding nodes of vehicle 10A that is included in the records of the received data, and selects records according to the application (S511). With this, in anomaly monitoring server 50, compared to the example illustrated in FIG. 9, the selection of training data can be performed with reduced processing load and more accurate information related to the occurrence of an anomaly on a surrounding node can be obtained.

Note that in the example illustrated in FIG. 10, an anomaly determination result is transmitted from vehicle 10B to vehicle 10A and then a log is uploaded from vehicle 10A to anomaly monitoring server 50, but a result of an anomaly determination made in vehicle 10A may also be transmitted from vehicle 10A to vehicle 10B and then a log configured like that in FIG. 6 may be uploaded from vehicle 10B to anomaly monitoring server 50. With this, logs from a greater number of vehicles connected to V2X network 1 are collected in anomaly monitoring server 50, and training data selected from among these logs is used in the creation of an anomaly detection model by anomaly monitoring server 50. The sequence of processes performed to create an anomaly detection model will be described later.

In the example illustrated in FIG. 10, although vehicle 10A receives an anomaly determination result solely from vehicle 10B, in practice, vehicle 10A can collect anomaly determination results from surrounding vehicle nodes that are capable of V2V communication. Moreover, for example, anomaly determiner 1255 may select, from among anomaly determination results received from surrounding nodes, those to be added to the first log information.

[3-3. Cases in Which Anomaly Determination for Another Node is Made In-Vehicle]

Figure 12:
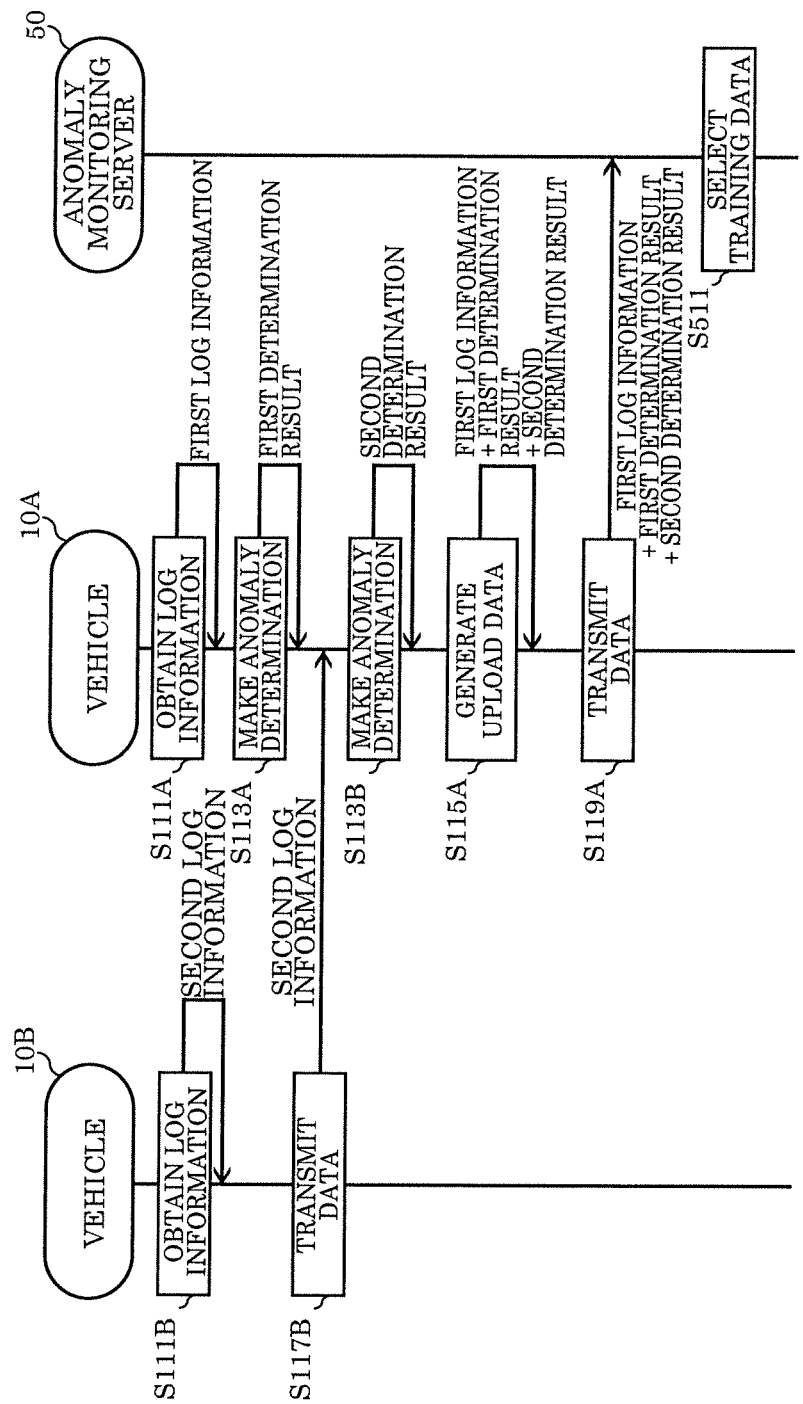
FIG. 12 is a sequence chart illustrating yet another example of a sequence of processes related to uploading data from a vehicle that is a target node to be monitored to the anomaly monitoring server.

FIG. 12 is a sequence chart illustrating another example of a sequence of processes related to uploading data from vehicle 10A, which is a target node to be monitored, to anomaly monitoring server 50. This example assumes that the in-vehicle network system in vehicle 10B, which is a surrounding node of vehicle 10A, includes components corresponding to data receiver 1251 and log information obtainer 1252 included in anomaly determination apparatus 125 and can thus obtain information indicating in-vehicle status, but does not include anomaly determiner 1255 or includes anomaly determiner 1255 but anomaly determiner 1255 is faulty, etc., and therefore cannot make an anomaly determination. The example in FIG. 12 differs from the example in FIG. 10 in that what is obtained by vehicle 10A from vehicle 10B is not the result of an anomaly determination made in vehicle 10B, but information indicating the in-vehicle status of vehicle 10B.

In vehicle 10A, the obtainment of log information performed by log information obtainer 1252 (S111A) and the anomaly determination (S113A) are performed in the same sequence of processes illustrated in FIG. 10. At this stage, first log information added with determination results (first determination result) illustrated in FIG. 5 is stored in data storage 1254.

Moreover, the obtainment of log information performed in vehicle 10B (S111B) is the same process as in the example illustrated in FIG. 10. Hereinafter, the log information indicating the in-vehicle status of vehicle 10B is also referred to as second log information, just like in the example in FIG. 10.

Next, second log information is transmitted from vehicle 10B to vehicle 10A (S117B). After vehicle 10A receives the second log information, anomaly determiner 1255 in vehicle 10A determines whether an anomaly occurred in vehicle 10B based on the second log information (S113B). The result of the determination related to the anomaly in vehicle 10B is also referred to as a second determination result just like in the example in FIG. 10.

Next, in vehicle 10A, anomaly determiner 1255 generates data (a log) to be uploaded to anomaly monitoring server 50, whose contents consist of the first log information added with the first determination result and the second determination result (S115A). Just like the log generated in step S115A in the example illustrated in FIG. 10, this data includes, associated with one another, (i) the in-vehicle status information and the in-vehicle anomaly determination result for vehicle 10A, which is the host node, and (ii) the anomaly determination result for vehicle 10B, which is a surrounding node. The data generated in step S115A is then transmitted to anomaly monitoring server 50 via data transmitter 1253 (S119A).

Figure 13:
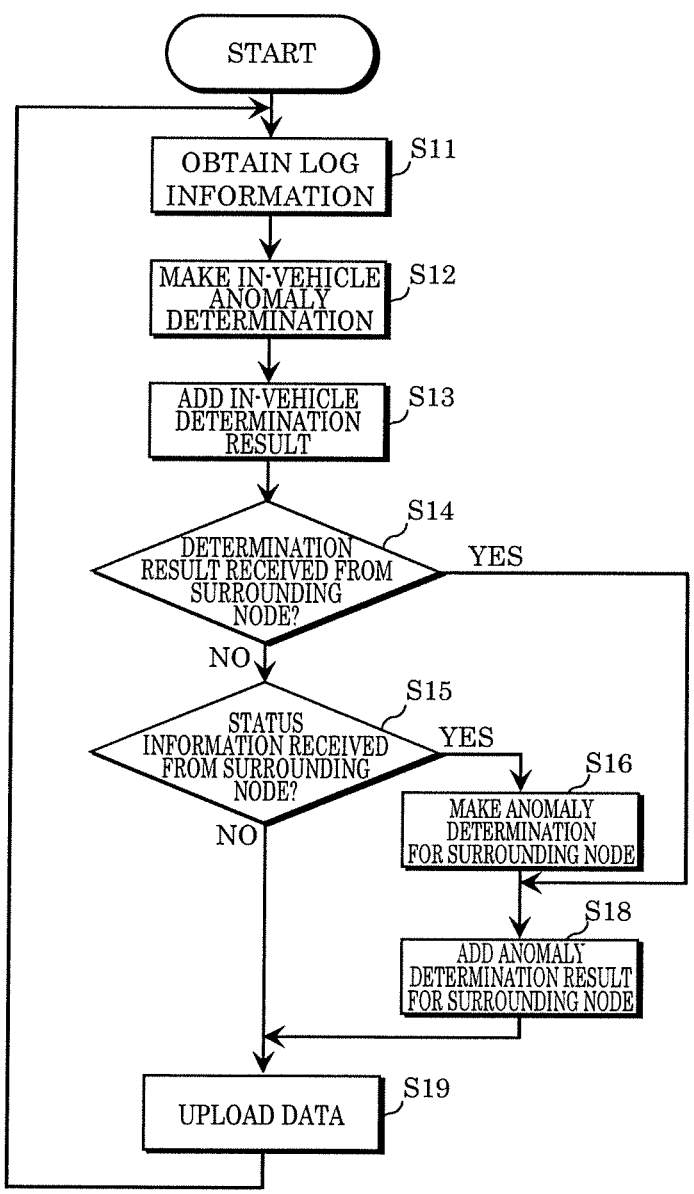
FIG. 13 is a flow chart illustrating another example of a sequence of processes performed by an anomaly determination apparatus according to an embodiment.

FIG. 13 is a flow chart illustrating one example of a sequence of the processes performed by anomaly determination apparatus 125 in vehicle 10A that are described in the above example. The flow chart illustrated in FIG. 13 differs from the sequence illustrated in FIG. 11 in that the flow chart in FIG. 13 additionally includes: a process for determining whether or not in-vehicle status information is received from vehicle 108 (step S15), which is performed when a determination result is not received from a surrounding node (no in S14); and a process for making a determination related to the occurrence of an anomaly on vehicle 10B (step S16), which is performed when in-vehicle status information is received (yes in step S15). In vehicle 10A, the sequence of processes illustrated in FIG. 13 is, for example, repeatedly executed at a regular interval.

Referring back to FIG. 12, after anomaly monitoring server 50 receives the data from vehicle 10A, training data selector 52 in anomaly monitoring server 50 selects training data (S511). With this, in anomaly monitoring server 50, compared to the example illustrated in FIG. 9, the selection of training data can be performed with reduced processing load and more accurate information related to the occurrence of an anomaly on a surrounding node can be obtained. This also makes it possible to support even those vehicles that cannot themselves make an anomaly determination based on status information.

Figure 14:
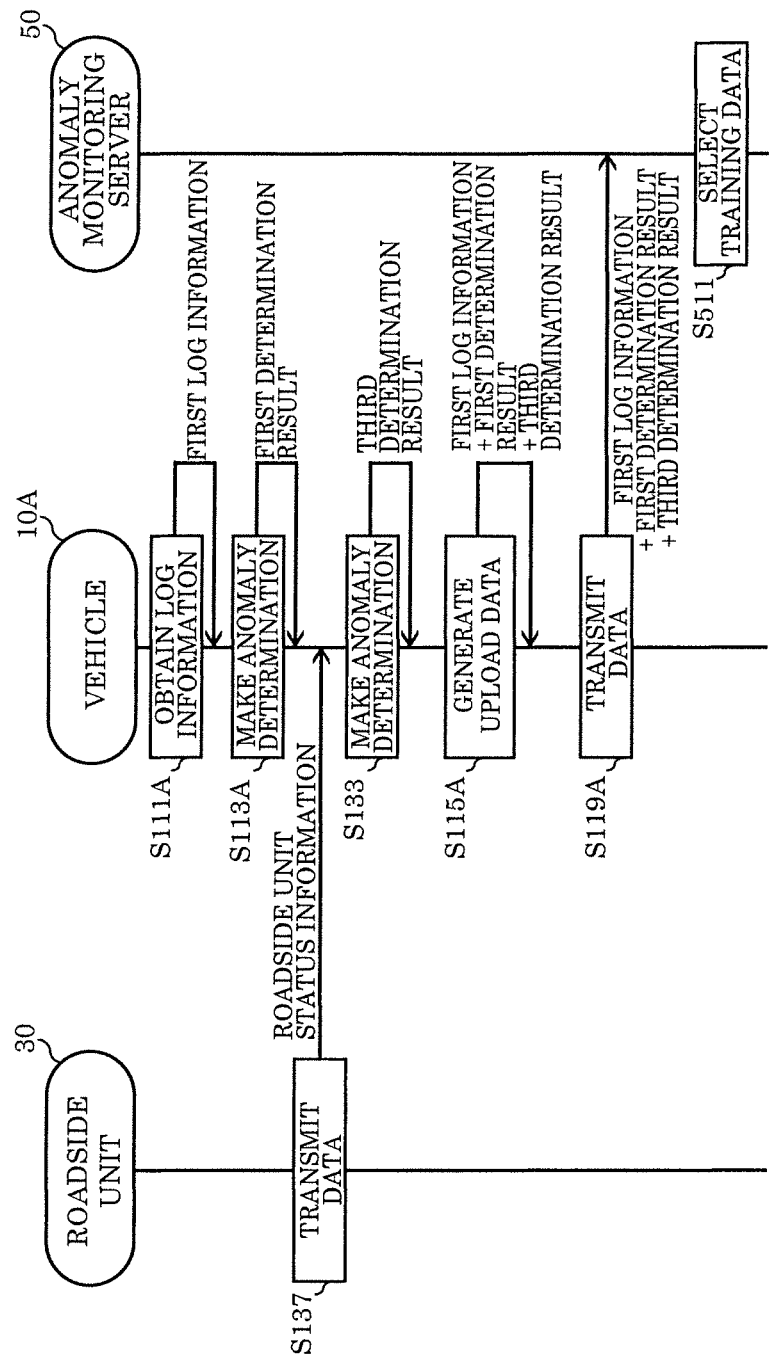
FIG. 14 is a sequence chart illustrating yet another example of a sequence of processes related to uploading data from a vehicle that is a target node to be monitored to the anomaly monitoring server.

Note that in the examples illustrated in FIG. 10 and FIG. 12, the anomaly determination result that vehicle 10A adds to the first log information is exemplified as an anomaly determination result from vehicle 10B, but the added anomaly determination result is not limited to being from vehicles 10; the added anomaly determination result may be from roadside units 30. In the example illustrated in FIG. 10, vehicle 10A may receive the result of an anomaly determination made in roadside unit 30 similar to as if it were made in vehicle 10B, and add the determination result to the first log information. Moreover, in the example illustrated in FIG. 12, vehicle 10A may receive information indicating the status in roadside unit 30 just like vehicle 10A would receive the information indicating the status in vehicle 10B from vehicle 10B, and add, to the first log information, the result of the determination of the presence or absence of an anomaly in roadside unit 30 made based on the received information. FIG. 14 is a sequence chart illustrating another example of a sequence of processes related to uploading data from vehicle 10A to anomaly monitoring server 50 in a case like described above where vehicle 10A receives information indicating the status in roadside unit 30. The example illustrated in FIG. 14 differs from the example illustrated in FIG. 12 in that roadside unit status information corresponding to the second log information for vehicle 10B is transmitted from roadside unit 30 to vehicle 10A (S137), anomaly determiner 1255 in vehicle 10A determines whether there is an anomaly in roadside unit 30 based on this roadside unit status information (S133), and the data transmitted to anomaly monitoring server 50 is data including first log information added with a first determination result and a third determination result related to roadside unit 30, which corresponds to the second determination result related to vehicle 10B.

[3-4. Cases in which a Result of a Determination Made Among Surrounding Nodes are Collected]

Figure 15:
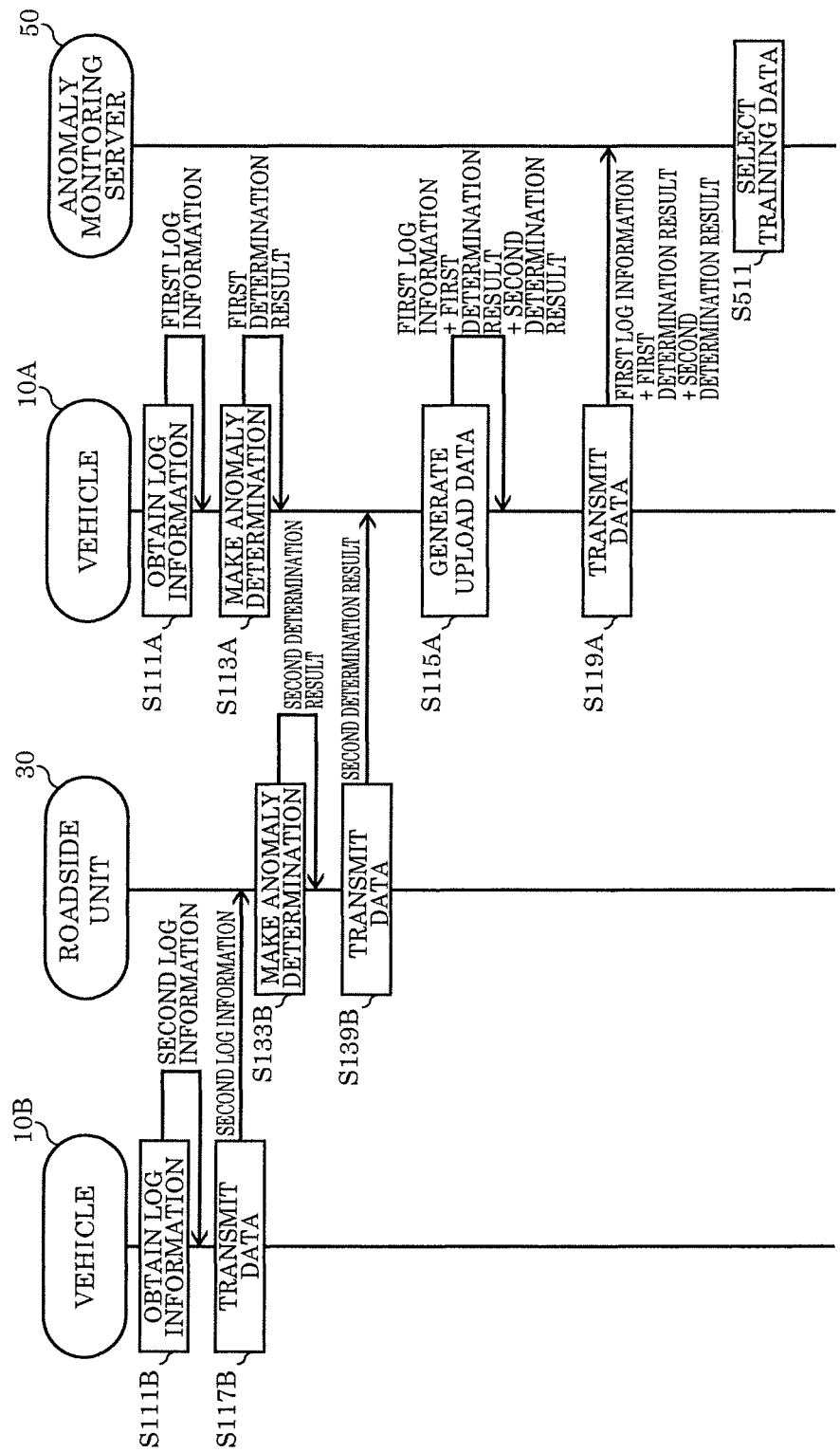
FIG. 15 is a sequence chart illustrating yet another example of a sequence of processes related to uploading data from a vehicle that is a target node to be monitored to the anomaly monitoring server.

FIG. 15 is a sequence chart illustrating yet another example of a sequence of processes related to uploading data from vehicle 10A, which is a target node to be monitored, to anomaly monitoring server 50. This example assumes that, just like in the example illustrated in FIG. 12, vehicle 10B, which is a surrounding node of vehicle 10A, does not include anomaly determiner 1255 or includes anomaly determiner 1255 but anomaly determiner 1255 is faulty, etc., and therefore cannot make an anomaly determination. The example in FIG. 15 differs from the example in FIG. 12 in that the node that makes an anomaly determination based on the status information for vehicle 10B is roadside unit 30 rather than vehicle 10A, and the result of the determination is supplied from roadside unit 30 to vehicle 10A.

In vehicle 10A, the obtainment of log information performed by log information obtainer 1252 (S111A) and the anomaly determination (S113A) respectively correspond to steps S111 and S113 in the sequence of processes illustrated in FIG. 9. At this stage, first log information added with determination results (first determination result) illustrated in FIG. 5 is stored in data storage 1254.

Moreover, the obtainment of log information performed in vehicle 10B (S111B) is the same process as in the examples illustrated in FIG. 10 and FIG. 12. Hereinafter, the log information indicating the in-vehicle status of vehicle 10B is also referred to as second log information, just like in the above example.

Next, second log information is transmitted from vehicle 10B to roadside unit 30 (S117B). In this example, roadside unit 30 includes functions that are equivalent to that of anomaly determiner 1255 in vehicle 10A, and upon receiving second log information, determines whether there is an anomaly in vehicle 10B based on second log information (S133B), which corresponds to step S113B performed in vehicle 10A in the example illustrated in FIG. 12. The result of the determination related to the anomaly in vehicle 10B is also referred to as a second determination result just like in the examples in FIG. 10 and FIG. 12.

Next, a second determination result is transmitted from roadside unit 30 to vehicle 10A (S139B). After data receiver 1251 receives the second determination result in vehicle 10A, just like in the example illustrated in FIG. 10, anomaly determiner 1255 adds the second determination result to the first log information, whereby data (a log) to be uploaded to anomaly monitoring server 50, whose contents consist of the first log information added with the first determination result and the second determination result, is generated by anomaly determiner 1255 (S115A). Just like the log generated in step S115A in the examples illustrated in FIG. 10 and FIG. 12, this data includes, associated with one another, (i) the in-vehicle status information and the in-vehicle anomaly determination result for vehicle 10A, which is the host node, and (ii) the anomaly determination result for vehicle 10B, which is a surrounding node. The data generated in step S115A is then transmitted to anomaly monitoring server 50 via data transmitter 1253 (S119A).

The exemplary sequence of processes performed by anomaly determination apparatus 125 in vehicle 10A in this example is illustrated by the flow chart of FIG. 11 or FIG. 13, although the sender of the second determination result differs.

Referring back to FIG. 15, after anomaly monitoring server 50 receives the data from vehicle 10A, training data selector 52 in anomaly monitoring server 50 selects training data (S511). With this, in anomaly monitoring server 50, compared to the example illustrated in FIG. 9, the selection of training data can be performed with reduced processing load and more accurate information related to the occurrence of an anomaly on a surrounding node can be obtained. This also makes it possible to support even those vehicles that cannot themselves make an anomaly determination based on status information.

Note that in the example illustrated in FIG. 15, the transmission destination of the anomaly determination result for vehicle 10B from roadside unit 30 is exemplified as, but not limited to, being only vehicle 10A. For example, the transmission destination of the result from roadside unit 30 may include vehicle 10B. For example, roadside unit 30 may transmit the anomaly determination result for vehicle 10B to all vehicles within a range in which V2I communication is possible.

[3-5. Other Comments]

Sections 3-2 through 3-4 above presented situations in which vehicle 10A, which is a target node to be monitored, collects: information indicating in-vehicle status at a given time; the result of the in-vehicle anomaly determination and the type of anomaly when an anomaly is detected; and the result of the anomaly determination for a surrounding node and the type of anomaly when an anomaly is detected, and presented sequences of processes and the exchange of information between nodes up through the transmission of the associated data to anomaly monitoring server 50. However, these situations are non-limiting examples; the content and channels of data that can be exchanged in V2X network 1 and variations including various sequences of processes that can be implemented by the nodes fall within the technical scope of the present disclosure.

For example, as described above, roadside units 30 may function as monitoring nodes that monitor vehicles 10 and roadside units 30 that double as monitoring nodes may collect in-vehicle status information or information related to in-vehicle anomaly determinations from vehicles 10 within communication range and transmit the collected information to vehicles 10 within communication range. In other words, roadside units 30 may obtain information related to in-vehicle anomalies from vehicles 10 within V2I communication range, and further share this information with other vehicles. In such cases, when in-vehicle status information is received, roadside unit 30 may make an anomaly determination based on this in-vehicle status information and may transmit the result of the determination and the type of anomaly when an anomaly is detected. Moreover, a monitoring node may provide anomaly monitoring server 50 with obtained information via communication network 20.

Moreover, in addition to the presence or absence of an anomaly in a given vehicle being transmitted to another vehicle via roadside unit 30, the presence or absence of an anomaly in a given roadside unit 30 may be shared via communication between vehicles.

Moreover, various data may be transmitted from roadside units 30 via communication network 20.

In sections 3-2 through 3-4 presented above, inter-node data transmission, such as the transmission of data from vehicle 10B to vehicle 10A, can be interpreted as being performed with a single specified partner, but the transmitting and receiving of data is not limited to this example. The transmitting and receiving of data between nodes can be performed using the various communication schemes that can be implemented in V2V communication or V2I communication. For example, the transmission destination may be all nodes present in an area in which communication is possible, the transmission destination may be limited to a specific group of those nodes, such as groups based on vehicle manufacturer, type of in-vehicle network system (for example, in-vehicle network system manufacturer or standards version), or node type (for example, whether the node is a vehicle or roadside unit), or different conditions may be applied to different groups (for example, vehicles may be limited by manufacturer while all roadside units are designated as transmission destinations).

[4. Processes Performed in Anomaly Monitoring Server]

Next, the sequence of processes performed in anomaly monitoring server 50 that monitors for the occurrence of an anomaly on vehicles 10 or on both vehicles 10 and roadside units 30 on V2X network 1 will be described. As described above, anomaly monitoring server 50 selects training data from the collection of logs, creates an anomaly detection model, and monitors for anomalies using the anomaly detection model. However, regarding the collection of logs, as this is merely the reception of logs transmitted by way of processes performed by the above-described target nodes to be monitored, description will be omitted, and hereinafter the other processes will be described.

[4-1. Anomaly Determination]

Figure 16:
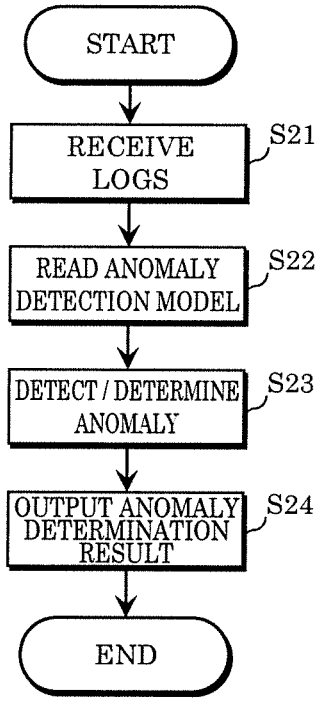
FIG. 16 illustrates a flow chart of one example of a sequence of processes for anomaly detection in the anomaly monitoring server.

First, the sequence of processes for making an anomaly determination using the anomaly detection model will be described. FIG. 16 is a flow chart illustrating one example of a sequence of processes for, from among the above-described two types of anomaly determinations that anomaly monitoring server 50 makes, the anomaly determination for the purpose of obtaining determination results that can be used in the selection of training data.

In anomaly monitoring server 50 connected to V2X network 1, data receiver 51 receives logs transmitted from target nodes to be monitored (S21).

Next, anomaly determiner 55 reads the anomaly detection model from data storage 54 (S22), and uses the anomaly detection model to perform anomaly detection on the records in the received log configured as illustrated in FIG. 4. When an anomaly is detected, anomaly determiner 55 determines that an anomaly occurred in the node that transmitted the log. When an anomaly is not detected, anomaly determiner 55 determines that an anomaly has not occurred in the node that transmitted the data. The result of the determination related to whether an anomaly occurred or not is output from anomaly determiner 55 (S24). More specifically, the outputting of the result is, for example, the saving of data including a log like the log illustrated in FIG. 4 added with the determination result, i.e., a log like the log illustrated in FIG. 5, into data storage 34. Note that the outputting of the result may be the transmission of the determination result to the node that transmitted the data and for which the determination was made.

Note that the anomaly determination of step S23 may be only a determination related to whether an anomaly occurred or not, and when an anomaly is detected, may include a more detailed determination related to, for example, the type of the detected anomaly based on the location of the occurrence. Moreover, when an anomaly is detected, the determination result output in step S24 may include a more detailed determination result related to the detected anomaly.

Figure 17:
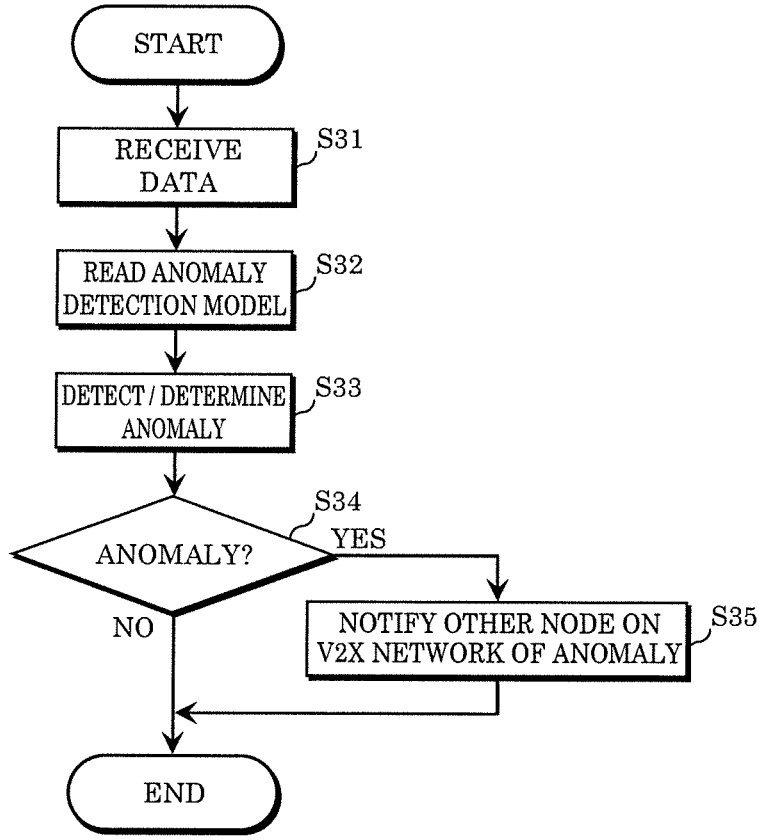
FIG. 17 illustrates a flow chart of one example of a sequence of processes for anomaly detection in a monitoring node on the V2X network.

FIG. 17 is a flow chart illustrating one example of a sequence of processes for, from among the above-described two types of anomaly determinations that anomaly monitoring server 50 makes, the anomaly determination for the purpose of monitoring V2X network 1.

In anomaly monitoring server 50 connected to V2X network 1, data receiver 51 receives data transmitted from target nodes to be monitored (S31).

Next, anomaly determiner 55 reads the anomaly detection model from data storage 54 (S32), and uses the anomaly detection model to perform anomaly detection on the received data (S33). When an anomaly is detected, anomaly determiner 55 determines that an anomaly occurred in the node that transmitted the log (yes in step S34), and further notifies of the anomaly occurrence in V2X network 1 (S35). All nodes on V2X network 1 may be notified, and, alternatively, nodes that are related to the node that generated the anomaly data in some aspect may be selectively notified. Here, "related in some aspect" means that the nodes are related based on, for example, node type (for example, whether the nodes are vehicles or roadside units), vehicle or roadside unit manufacturer, in-vehicle network system type or roadside unit control system type (for example, the manufacturer or standards version). This information may be obtained based on information included in the logs collected from the target nodes to be monitored, or may be indicated in separately collected data that is usable by anomaly monitoring server 50.

When there is no detected anomaly, anomaly determiner 55 determines that an anomaly has not occurred in the node that transmitted the log (no in step S34), and ends the processing for the anomaly determination.

Note that the anomaly determination result may be stored in data storage 54 included in anomaly monitoring server 50 when the anomaly determination is being made for the purpose of monitoring V2X network 1 as well.

Note that the processes included in the flow chart illustrated in FIG. 17 are not limited to being performed by anomaly monitoring server 50; the processes may be performed by anomaly determiner 35 and anomaly determiner 1255 in roadside units 30 or vehicles 10 that additionally function as monitoring nodes on V2X network 1.

[4-2. Training Data Selection and Anomaly Detection Model Creation]

Figure 18:
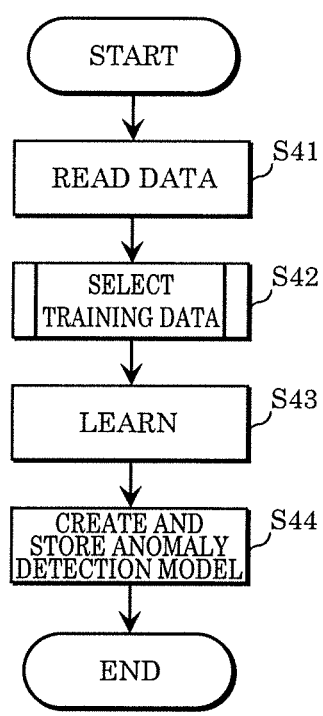
FIG. 18 illustrates a flow chart of one example of a sequence of processes for creating an anomaly detection model in the anomaly monitoring server.

Next, the sequence of processes for creating an anomaly detection model, including selecting training data, will be described. FIG. 18 illustrates a flow chart of an example of a sequence of processes for creating an anomaly detection model in anomaly monitoring server 50.

First, training data selector 52 reads a log stored in data storage 54 (S41).

Next, training data selector 52 causes anomaly determiner 55 to perform predetermined processes on the read out log as needed, and selects a record (S42). The processing content varies depending on the state and application of the read out log; this will be described in greater detail later.

Next, learner 53 learns using the training data selected by training data selector 52 (S43), and the resulting anomaly detection model is stored in data storage 54 (S44). An anomaly detection model created (including updated) in such a manner is, for example, used in the anomaly determination in anomaly monitoring server 50 as described above, and/or transmitted to each node on V2X network 1 that makes an anomaly determination.

Next, step S42 performed by training data selector 52 will be described in greater detail.

Figure 19:
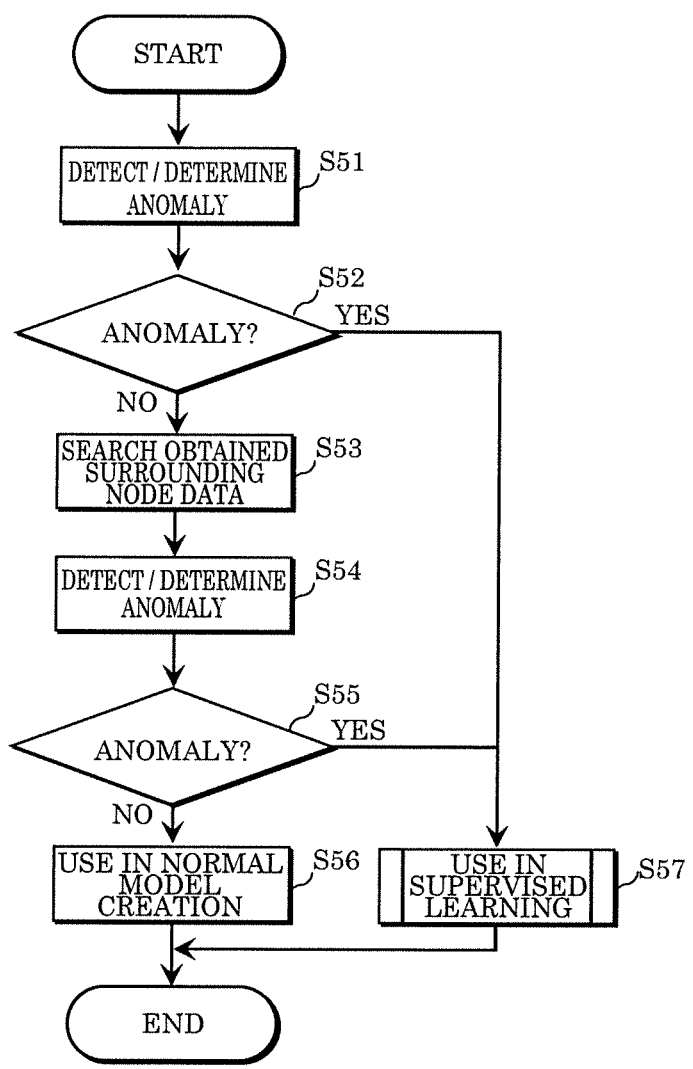
FIG. 19 illustrates a flow chart of one example of a sequence of processes for selecting training data in the anomaly monitoring server.

FIG. 19 illustrates a flow chart of one example of a sequence of processes for selecting training data in anomaly monitoring server 50. In this example, the data received by anomaly monitoring server 50 has a configuration like that illustrated in FIG. 4, and although it includes information indicating time, position, and in-vehicle status, it does not include information related to surrounding nodes. When the log read from data storage 54 is configured like in FIG. 4, training data selector 52 causes anomaly determiner 55 to make an anomaly determination based on the information indicating the in-vehicle status included in a record (S51). When there is an anomaly (yes in S52), training data selector 52 selects this record as data to be used by learner 53 in supervised learning in the next training session (S57). Supervised learning will be described later.

When there is no anomaly (no in S52), using time information and position information included in this record, training data selector 52 searches obtained data on surrounding nodes for a record on another node present, at the time of generation of this record, in the surrounding area of the node that transmitted the log (S53). Next, training data selector 52 obtains an anomaly determination result based on this info, using a method appropriate for the information included in the record for the surrounding node, which was obtained as a result of the search. In other words, when the information regarding a surrounding node includes an anomaly determination result, that result is obtained, and when the information does not include an anomaly determination result, anomaly determiner 55 makes an anomaly determination and the result thereof is obtained (S54).

Next, when the record obtained as a result of the search indicates that there is an anomaly in a surrounding node (yes in S55), training data selector 52 selects this record as data to be used by learner 53 in supervised learning in the next training session (S57). When there is no anomaly (no in S55), this record is selected as data to be used by learner 53 in the creation of a normal model in the next training session (S56).

Figure 20:
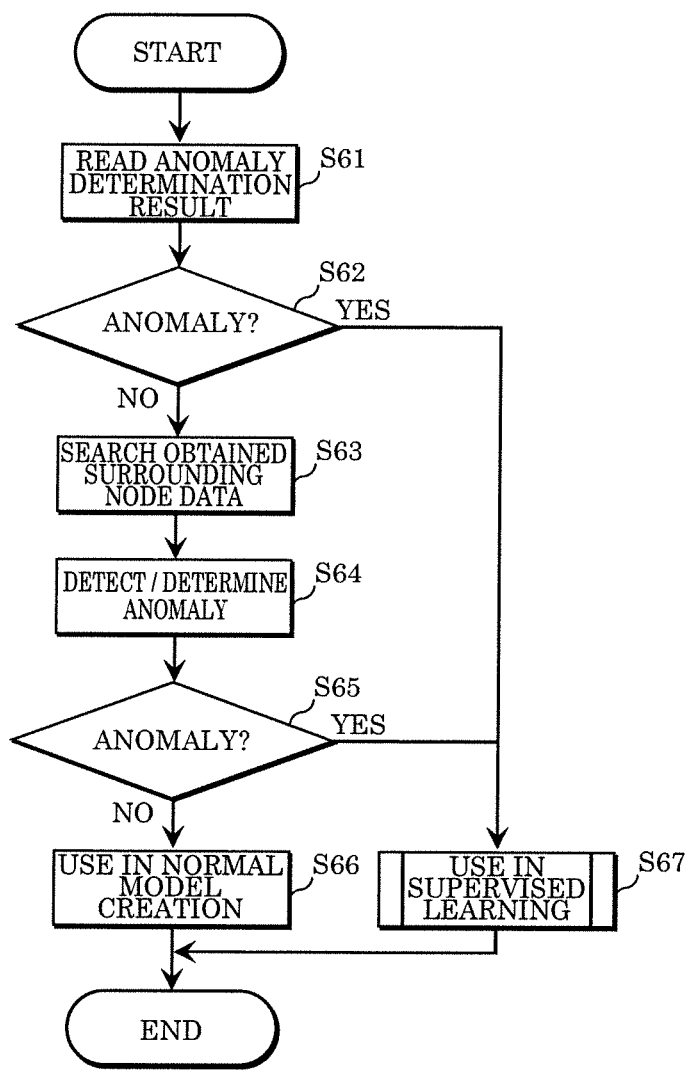
FIG. 20 illustrates a flow chart of another example of a sequence of processes for selecting training data in the anomaly monitoring server.

FIG. 20 illustrates a flow chart of another example of a sequence of processes for selecting training data in anomaly monitoring server 50. In this example, the data received by anomaly monitoring server 50 has a configuration like that illustrated in FIG. 5, and although it includes information indicating time, position, and in-vehicle status, as well as information related to an in-vehicle anomaly, it does not include information related to surrounding nodes. When the log read from data storage 54 is configured like in FIG. 5, training data selector 52 reads an in-vehicle anomaly determination result included in a record (S61). When there is an anomaly (yes in S62), training data selector 52 selects this record as data to be used by learner 53 in supervised learning in the next training session (S67).

Processes for when there is no anomaly are the same as those from step S52 to step S56 or S57 in FIG. 19. In other words, when there is no anomaly (no in S62), using time information and position information included in this record, training data selector 52 searches obtained data on surrounding nodes for a record on another other node (S63). Next, training data selector 52 obtains an anomaly determination result based on this info, using a method appropriate for the information included in the record for the surrounding node, which was obtained as a result of the search (S64).

Next, when the record obtained as a result of the search indicates that there is an anomaly in a surrounding node (yes in S65), training data selector 52 selects this record as data to be used by learner 53 in supervised learning in the next training session (S67). When there is no anomaly (no in S65), this record is selected as data to be used by learner 53 in the creation of a normal model in the next training session (S66).

Figure 21:
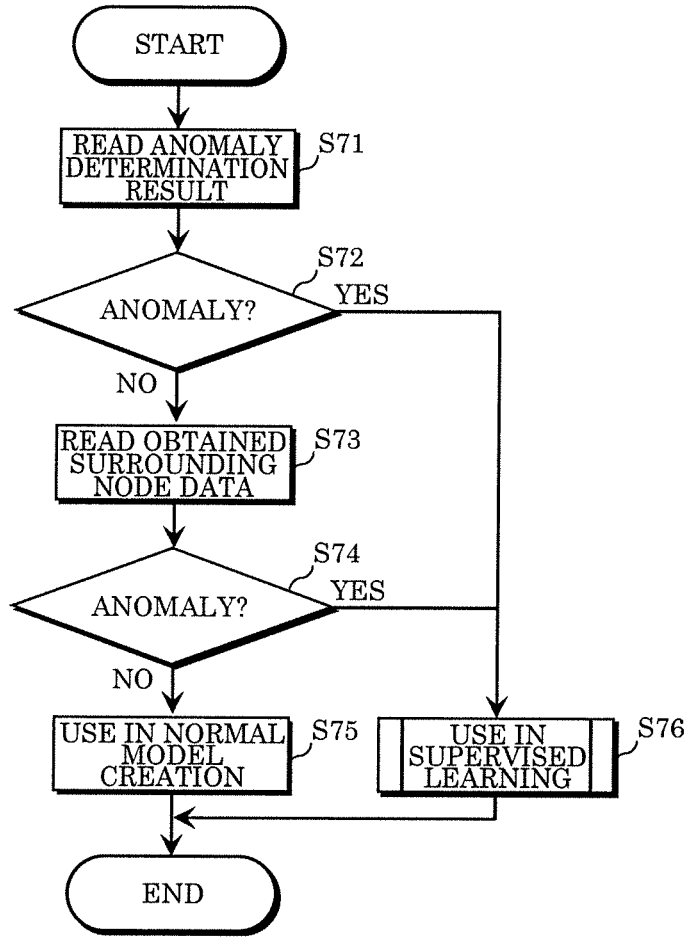
FIG. 21 illustrates a flow chart of yet another example of a sequence of processes for selecting training data in the anomaly monitoring server.

FIG. 21 illustrates a flow chart of yet another example of a sequence of processes for selecting training data in anomaly monitoring server 50. In this example, the data received by anomaly monitoring server 50 has a configuration like that illustrated in FIG. 6, and includes information indicating time, position, and in-vehicle status, information related to an in-vehicle anomaly, and information related to surrounding nodes. When the log read from data storage 54 is configured like in FIG. 5, training data selector 52 reads an in-vehicle anomaly determination result included in a record (S71). When there is an anomaly (yes in S72), training data selector 52 selects this record as data to be used by learner 53 in supervised learning in the next training session (S76).

When there is no anomaly (no in S72), training data selector 52 reads the anomaly determination result for a surrounding node included in the record (S73). When there is an anomaly (yes in S74), training data selector 52 selects this record as data to be used by learner 53 in supervised learning in the next training session (S76). When there is no anomaly (no in S74), this record is selected as data to be used by learner 53 in the creation of a normal model in the next training session (S75).

Figure 22:
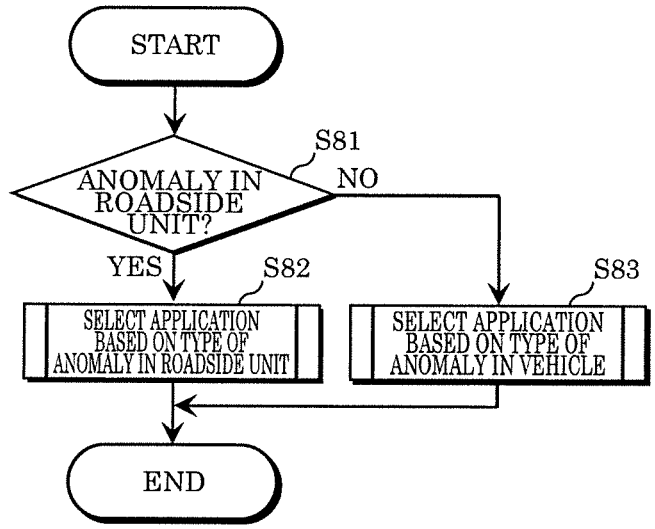
FIG. 22 illustrates a flow chart of one example of a sequence of processes for selecting training data for supervised learning in the anomaly monitoring server.
Figure 23A:
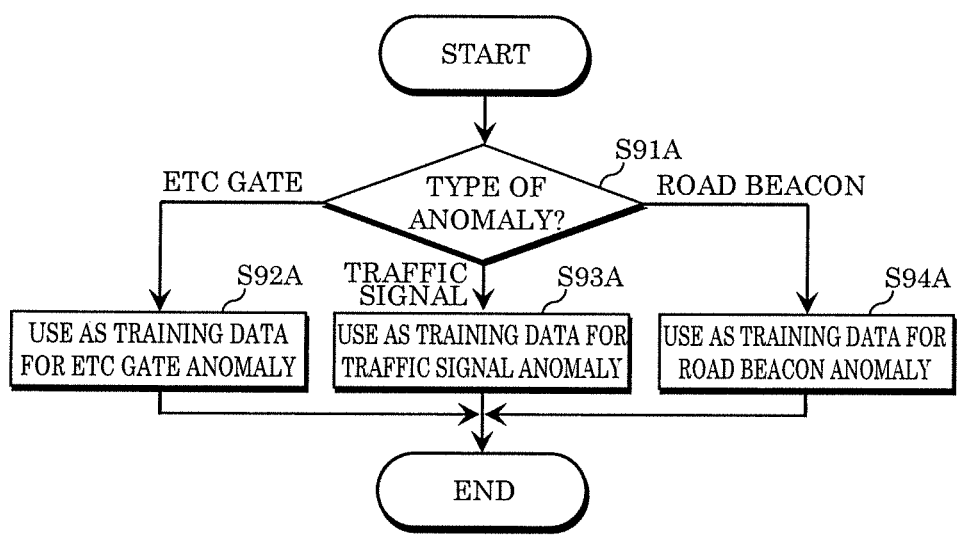
FIG. 23A illustrates a flow chart of one example of a sequence of processes for selecting training data for supervised learning in the anomaly monitoring server.
Figure 23B:
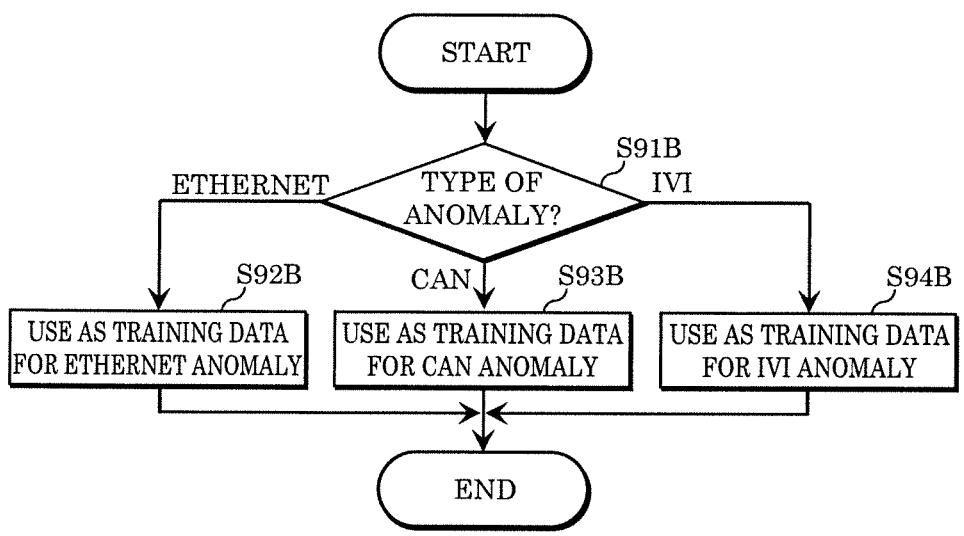
FIG. 23B illustrates a flow chart of one example of a sequence of processes for selecting training data for supervised learning in the anomaly monitoring server.

Next, supervised learning according to this embodiment will be described. In supervised learning, a large amount of data (records) known to indicate in-vehicle status when an anomaly occurred in the host vehicle or a surrounding vehicle is provided to learner 53. Learner 53 extracts features from this data, and based on the features, classifies the data as either data associated with an anomaly occurrence or normal data, that is to say, creates a model for anomaly detection. Moreover, if the anomaly can be categorized, such as categorized based on the type of node in which the anomaly occurred or based on the location, for example, at which the anomaly occurred in each node, it is possible to obtain training data for supervised learning for a single category. Training learner 53 using this training data creates an anomaly detection model used for identifying whether information indicating the status of a certain type of node or the status of a certain location in a certain type of node is anomalous or not. Next, a specific example of choosing which training data to use depending on the type of anomaly detection model desired to be created will be given. FIG. 22, FIG. 23A, and FIG. 23B illustrate flow charts of examples of sequences of processes for selecting training data for supervised learning in anomaly monitoring server 50.

Referring to FIG. 22, first, in training data selector 52, it is determined whether an anomaly in a given record in a collected log is an anomaly that occurred in vehicle 10, which is the node that transmitted the log, or an anomaly corresponding to a node in the surrounding area of that vehicle 10, exemplified here as roadside unit 30 (S81). When the anomaly in the given record occurred in roadside unit 30 (S82 from "yes" in S81), training data selector 52 further selects the application of the record to be used as the training data for supervised learning in accordance with the type of anomaly that occurred in roadside unit 30 (S91A). In the example in FIG. 23A, different applications of the record as the training data for supervised learning are selected depending on whether the type of roadside unit 30 anomaly is an ETC gate anomaly (S92A), a traffic signal anomaly (S93A), or a road beacon anomaly (S94A). When the anomaly is an anomaly in vehicle 10 (S83 from "no" in S81), training data selector 52 further selects the application of the record as the training data for supervised learning in accordance with the type of anomaly that occurred in vehicle 10 (S91A). In the example illustrated in FIG. 23B, whether the type of anomaly in vehicle 10 is an anomaly in an Ethernet section of in-vehicle network system 100 (S92B), an anomaly in the CAN in in-vehicle network system 100 (S93B), or an anomaly in the in-vehicle infotainment system (IVI) section of in-vehicle network system 100 (S94B) is determined (S91B), and different applications of the record as the training data for supervised learning are selected depending on the result of the determination. The selection is made with reference to information regarding the surrounding node anomaly type included in the log. Note that the above anomaly types are non-limiting examples. For example, the type of anomaly may indicate whether the anomaly is simply in a vehicle or roadside unit.

[5. Advantages, etc.]

In this embodiment, when a log of information indicating the state of a vehicle 10 is generated in the vehicle 10, whether or not an anomaly occurred at that time in the vehicle 10 or a surrounding node (another vehicle or roadside unit) is determined at a time and location (i.e., a node at the location) as close as possible to the situation in which the information was obtained by vehicle 10, and the result of the determination is added to information indicating the status of the vehicle 10. The closest embodiment to "a time and location that is as close as possible" is one in which a determination related to an anomaly in a vehicle 10 is made by the anomaly determination apparatus in the vehicle 10 at the time that the status information is obtained by the vehicle 10. The closest embodiment to a determination related to an anomaly in a surrounding node is one in which the determination is made in the surrounding node, but the next closest embodiment is one in which the determination is made by the vehicle 10 that obtained the status information, based on status information received from the surrounding node. Alternatively, another next closest embodiment is one in which a determination related to an anomaly in one surrounding node made by another surrounding node is obtained by a vehicle 10 that obtained information indicating its own status. In any of these embodiments, there is a high probability that the anomaly determination will be more accurate or feasible compared to when an anomaly determination is made for each record in a log after the log is collected by anomaly monitoring server 50, and it is also possible to relieve the load placed on anomaly monitoring server 50.

By adding such a result of a determination related to an anomaly, when selecting training data for the purpose of creating a normal anomaly detection model from records in logs of information indicating the status of vehicle 10, it is possible to exclude records associated with an anomaly. Using such training data yields a higher quality normal model, which is conductive to improving anomaly detection accuracy.

Moreover, depending on how the monitoring service is administered, cases in which anomaly monitoring server 50 collects only logs from some vehicles such as vehicles of a specific manufacturer, vehicles of a specific type, or vehicles equipped with a specific in-vehicle network system are conceivable. Cases in which information is not exchanged between anomaly monitoring server 50 and a roadside unit for some reason or another are also conceivable. Even in such cases, so long as the communication standard and data format conform to a standard used in V2X, it is possible to collect logs from which the above-described selection can be performed by anomaly monitoring server 50, by vehicles 10 communicating and exchanging information related to anomalies with surrounding nodes while driving.

Moreover, supervised learning may be additionally performed using records associated with anomalies that occurred in the host node or a surrounding node. Using an anomaly detection model created additionally using supervised learning makes it possible for a more accurate anomaly determination to be made, and improves the speed at which the accuracy of the anomaly determination increases.

In other words, using, in the creation of an anomaly detection model for monitoring anomalies on the V2X network, training data dynamically selected with reference to information related to each node and additionally information related to an anomaly in a surrounding node thereof yields an anomaly detection model that can more accurately detect anomalies. This increases the security of the V2X network and improves automobile safety and convenience.

(Variations, Etc.)

Although only some exemplary embodiment of the present disclosure have been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure. For example, the following variations are included within an aspect of the present disclosure.

(1) The number of and connection configuration between the various nodes that make up V2X network 1 illustrated in FIG. 1 are presented for the purpose of illustrating the embodiment, and are mere examples that do not limit the present disclosure. Moreover, as described above, not all vehicles 10 and roadside units 30 included in V2X network 1 have configurations like those shown in FIG. 3 and FIG. 7 from the beginning. Time is required until the anomaly determination made in host nodes and between nodes becomes widespread in use. Various examples are given above regarding aspects of the execution of the anomaly determination for each node during this transitional period, and aspects of usage and provision of information regarding the determination result, but other aspects that can be easily arrived at from these examples are also included within the technical scope of the present disclosure.

(2) The sequences of steps of the various procedures (such as the sequences illustrated in FIG. 9 through FIG. 23B) described in the above embodiment are not necessarily limited to the sequences described above. Without departing from the scope of the present disclosure, the sequence of steps may be changed, multiple steps may be performed concurrently, or some steps may be omitted.

(3) Moreover, the configuration of the data in the logs described in the above embodiment (see FIG. 4 through FIG. 6) is not limited to the examples in the figures in a precise sense. For example, it is sufficient so long as the information in the records in the logs illustrated in these figures is associated by some given means; it is not necessary for the information to be included in a single table or list. Moreover, the data included in the logs is not limited to the data illustrated in these figures. The apparatus or system according to the present disclosure that collects and uses these logs, such as anomaly monitoring server 50 or the server, for creating training data, may additionally include information for dividing the nodes into the groups described above, such as IDs for identifying the nodes. Moreover, the data transmitted from the nodes may also include this information.

(4) In the logs given as examples in the above embodiment (see FIG. 4 through FIG. 6), the result of a determination related to an anomaly in the host vehicle or a surrounding node is exemplified as a binary result of either "anomaly" or "normal", but this example is not limiting. For example, values expressing the possibility of the occurrence of an anomaly in multiple stages, or in the case of an anomaly, values that express the severity of the anomaly in multiple stages may be used.

(5) Some or all of the elements included in each of the devices in the embodiments above may be realized as a single system large scale integration (LSI) circuit. The system LSI circuit is a super multifunctional LSI circuit manufactured by integrating a plurality of elements onto a signal chip. To be more specific, the system LSI circuit is a computer system configured with a microprocessor, ROM, and RAM, for example. The ROM stores a computer program. The microprocessor operates according to the computer program, so that a function of the system LSI circuit is achieved. The elements in each of the devices in the embodiments above may be implemented by individual chips. Alternatively, some or all of the elements may be implemented by a single chip. Although the integrated circuit implementing these elements is referred to as a system LSI circuit here, the integrated circuit may be referred to as an IC, an LSI circuit, a super LSI circuit, or an ultra LSI circuit depending on the scale of integration. Moreover, the method of implementation of the elements using an integrated circuit is not limited to application of an LSI circuit. The elements may be implemented by a dedicated circuit or a general-purpose processor. It is also possible to use a field programmable gate array (FPGA) that can be programmed after being manufactured, or a reconfigurable processor in which connection and setting of circuit cells in an LSI can be reconfigured. Furthermore, when a circuit integration technology that replaces LSI circuits comes along owing to advances of the semiconductor technology or to a separate derivative technology, the function blocks may be understandably integrated using that technology. For example, adaptation of biotechnology is a possibility.

(6) Some or all of the elements included in each of the devices described above may be implemented as an IC card or a standalone module that can be inserted into and removed from the corresponding device. The IC card or the module is a computer system configured with a microprocessor, ROM, and RAM, for example. The IC card or the module may include the aforementioned super multifunctional LSI circuit. The microprocessor operates according to the computer program, so that a function of the IC card or the module is achieved. The IC card or the module may be tamper-resistant.

(7) In one aspect, the present disclosure may be implemented as a method including some or all of the processes included in, for example, FIG. 9 through FIG. 23B and descriptions in the specification related to these figures.

For example, an anomaly determination method that is executed by a processor included in anomaly determination apparatus 125 included in a first node that is a target to be monitored on V2X network 1, includes: obtaining log information including: a time; and status information, the status information indicating a status, of the first node at the time, as indicated by at least one of sensor data or control data on the first node (for example, step S11); making a first anomaly determination related to an occurrence of an anomaly on the first node at the time (for example, step S12); making a second anomaly determination related to an occurrence of an anomaly on a second node at the time, based on second node information that is related to an anomaly in the second node and obtained from the second node, the second node being another node that is a target to be monitored on V2X network 1 and is in a surrounding area of the first node (for example, step S14); when a result of the second anomaly determination indicates an occurrence of an anomaly on the second node, adding, to the log information, anomaly information indicating the occurrence of the anomaly on the second node (for example, step S18); and transmitting the log information added with the anomaly information to at least one node on V2X network 1 (for example, step S19).

Moreover, for example, a method for creating an anomaly detection model is executed by a processor included in a server, and includes: obtaining log information generated by a target node to be monitored on V2X network 1 (for example, step S21); selecting predetermined information from this log information, and performing machine learning using the selected predetermined information as training data to create an anomaly detection model to be used to detect an anomaly by a monitoring node that monitors the target node to be monitored on V2X network 1 (for example, step S44). Here, in the method for creating an anomaly detection model, the log information includes, in association with one another: a time; status information indicating a status, of the target node to be monitored at the time, as indicated by at least one of sensor data or control data on the target node to be monitored; first anomaly information indicating whether an anomaly occurred on the target node to be monitored at the time; and second anomaly information indicating whether, at the time, an anomaly occurred on a second node in the surrounding area of the node to be monitored that communicates with the node to be monitored. In the selecting, the predetermined information is selected based on the first anomaly information and the second anomaly information. Here, the predetermined information is, for example, information used in the training data that is the normal model, or, for example, information used in the training data that is for supervised learning.

(8) Moreover, in one aspect, the present disclosure may be implemented by a computer program that causes a computer to execute processing related to the above methods, and as a digital signal of such a computer program.

(9) Moreover, in one aspect, the present disclosure may be implemented as a computer-readable recording medium, such as a flexible disk, hard disk, CD-ROM, MO, DVD, DVD-ROM, DVD-RAM, Blu-ray (registered trademark) Disc (BD), or semiconductor memory recorded with this computer program or digital signal, or as the digital signal recorded on such a recording medium. Moreover, in one aspect, the present disclosure may be implemented as a means that transmits the computer program or digital signal over a telecommunication line, wireless or wired communication line, a network—one representative example of which is the internet or data broadcasting.

(10) Moreover, in one aspect, the present disclosure may be implemented as a computer system including a microprocessor and memory, wherein the memory stores the computer program described above and the microprocessor operates according to the computer program. Moreover, by recording the program or digital signal on the recording medium and transporting the recording medium, or by transporting the program or digital signal over, for example, a network, the present disclosure may be implemented by some other independent computer system.

(11) An embodiment implemented through any combination of the elements and functions in the embodiment and variations described above is also included in the scope of the present disclosure.

INDUSTRIAL APPLICABILITY

The present disclosure is applicable in the collection and selection of training data for creating, via machine learning, an anomaly detection model to be used to detect an anomaly.

What is claimed is:

1. A server, comprising:
a processor;
data storage; and
a memory including at least one set of instructions that, when executed by the processor causes the processor to perform operations including:
  obtaining log information generated by a first vehicle that is a target to be monitored on a V2X network;
  selecting predetermined information from the log information obtained; and
  performing machine learning using, as training data, the selected predetermined information, to create an anomaly detection model to be used to detect an anomaly by a monitoring node that monitors the first vehicle on the V2X network,
  wherein the data storage is for storing the obtained log information and the anomaly detection model created by the machine learning,
the log information includes a plurality of records,
each of the plurality of records includes, in association with one another:
  a time;
  status information indicating a status, of the first vehicle at the time, as indicated by at least one of sensor data or control data on the first vehicle;
  first anomaly information indicating a result of an anomaly determination on the first vehicle at the time; and
  second anomaly information indicating a result of, at the time, an anomaly determination on a second vehicle and a roadside unit in a surrounding area of the first vehicle that communicate with the first vehicle, in the selecting, for each of the plurality of records:
  when the first anomaly information in the record indicates an anomaly, the record is selected as the predetermined information; and
  when the first anomaly information in the record indicates no anomaly and the second anomaly information in the record indicates an anomaly, the record is selected as the predetermined information, and
in the performing, the anomaly detection model is created via supervised learning using, as the training data, the predetermined information selected.

2. The server according to claim 1,
wherein in the selecting, for each of the plurality of records:
  when the first anomaly information in the record indicates no anomaly and the second anomaly information in the record indicates no anomaly, the record is selected as the predetermined information, and
in the performing, a normal model is created as the anomaly detection model using, as the training data, the predetermined information selected.

3. The server according to claim 1,
wherein when there is an anomaly on the first vehicle, the first anomaly information further indicates a type of the anomaly, and
in the selecting, among the plurality of records, a record that indicates a same type of the anomaly on the first vehicle is collected and selected as the predetermined information.

4. The server according to claim 1,
wherein when there is an anomaly on the second vehicle and the roadside unit, the second anomaly information further indicates a type of the anomaly on the second vehicle and the roadside unit, and
in the selecting, among the plurality of records, a record that indicates a same type of the anomaly on the second vehicle and the roadside unit is collected and selected as the predetermined information.

5. The server according to claim 1,
wherein the processor is configured to perform operations further including: performing anomaly detection on data transmitted from the target to be monitored on the V2X network, using the created anomaly detection model.

6. The server according to claim 1,
wherein the first vehicle is a vehicle including an in-vehicle network system that enables communication with another node on the V2X network.

7. The server according to claim 1,
wherein the roadside unit is a roadside unit including an information processing system that enables communication with another node on the V2X network, and the second vehicle is a vehicle including an in-vehicle network system that enables communication with another node on the V2X network.

8. A non-transitory computer-readable recording medium for use in a computer that includes a data storage, the recording medium having a computer program recorded thereon for causing the computer to execute:
  obtaining log information generated by a first vehicle that is a target to be monitored on a V2X network;
  selecting predetermined information from the log information obtained; and
  performing machine learning using, as training data, the selected predetermined information, to create an anomaly detection model to be used to detect an anomaly by a monitoring node that monitors the first vehicle on the V2X network,
  wherein the data storage is for storing the obtained log information and the anomaly detection model created by the machine learning,
the log information includes a plurality of records, each of the plurality of records includes, in association with one another:
  a time;
  status information indicating a status, of the first vehicle at the time, as indicated by at least one of sensor data or control data on the first vehicle;
  first anomaly information indicating a result of an anomaly determination on the first vehicle at the time; and
  second anomaly information indicating a result of, at the time, an anomaly determination on a second vehicle and a roadside unit in a surrounding area of the first vehicle that communicate with the first vehicle, in the selecting, for each of the plurality of records:
  when the first anomaly information in the record indicates an anomaly, the record is selected as the predetermined information; and
  when the first anomaly information in the record indicates no anomaly and the second anomaly information in the record indicates an anomaly, the record is selected as the predetermined information, and
in the performing, the anomaly detection model is created via supervised learning using, as the training data, the predetermined information selected.

9. A method executed by a server including a processor and a data storage, the method comprising:
  obtaining log information generated by a first vehicle that is a target to be monitored on a V2X network;
  selecting predetermined information from the log information obtained; and
  performing machine learning using, as training data, the selected predetermined information, to create an anomaly detection model to be used to detect an anomaly by a monitoring node that monitors the first vehicle on the V2X network,
  wherein the data storage is for storing the obtained log information and the anomaly detection model created by the machine learning,
  the log information includes a plurality of records, each of the plurality of records includes, in association with one another:
    a time;
    status information indicating a status, of the first vehicle at the time, as indicated by at least one of sensor data or control data on the first vehicle;
    first anomaly information indicating a result of an anomaly determination on the first vehicle at the time; and
    second anomaly information indicating a result of, at the time, an anomaly determination on a second vehicle and a roadside unit in a surrounding area of the first vehicle that communicate with the first vehicle,
  in the selecting, for each of the plurality of records:
    when the first anomaly information in the record indicates an anomaly, the record is selected as the predetermined information; and
    when the first anomaly information in the record indicates no anomaly and the second anomaly information in the record indicates an anomaly, the record is selected as the predetermined information, and
  in the performing, the anomaly detection model is created via supervised learning using, as the training data, the predetermined information selected.

* * * * *